US012266494B2

(12) United States Patent
Heremans et al.

(10) Patent No.: US 12,266,494 B2
(45) Date of Patent: Apr. 1, 2025

(54) ELECTRICALLY CONTROLLED SOLID-STATE THERMAL SWITCH

(71) Applicant: Ohio State Innovation Foundation, Columbus, OH (US)

(72) Inventors: Joseph P. Heremans, Upper Arlington, OH (US); Brandi Wooten, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 45 days.

(21) Appl. No.: 17/932,087

(22) Filed: Sep. 14, 2022

(65) Prior Publication Data

US 2023/0100399 A1 Mar. 30, 2023

Related U.S. Application Data

(60) Provisional application No. 63/243,860, filed on Sep. 14, 2021.

(51) Int. Cl.
*H01H 57/00* (2006.01)
*H01H 61/01* (2006.01)

(52) U.S. Cl.
CPC ............ *H01H 57/00* (2013.01); *H01H 61/01* (2013.01)

(58) Field of Classification Search
CPC ............................... H01H 57/00; H01H 61/01
USPC ........................................................... 337/14
See application file for complete search history.

(56) References Cited

U.S. PATENT DOCUMENTS

| | | | | |
|---|---|---|---|---|
| 3,531,752 A * | 9/1970 | Gourley | G05D 23/01 | 337/182 |
| 3,578,068 A * | 5/1971 | Elliott | G05D 23/01 | 165/277 |
| 4,515,206 A * | 5/1985 | Carr | F28F 13/16 | 165/96 |
| 5,188,171 A * | 2/1993 | Stefanov | F28F 13/00 | 165/96 |
| 5,379,601 A * | 1/1995 | Gillett | G05D 23/01 | 62/298 |
| 7,154,369 B2 * | 12/2006 | Dietz | F25D 19/006 | 62/383 |

(Continued)

FOREIGN PATENT DOCUMENTS

WO WO-2004068604 A1 * 8/2004 ............. H01L 37/00

OTHER PUBLICATIONS

WO 2004068604 A1 English translation (Year: 2004).*

*Primary Examiner* — Anatoly Vortman
(74) *Attorney, Agent, or Firm* — Wood Herron & Evans LLP

(57) ABSTRACT

Electrically controlled solid-state thermal switches and methods of controlling heat flow. An electrostrictive material is electromagnetically coupled to first and second electrodes that provide an electric field to the electrostrictive material. Different portions of the electrostrictive material are thermally coupled to each of a heat sink and a thermal load so that heat flowing from one into the other passes through the electrostrictive material. A control voltage is applied to the electrodes to selectively generate the electric field, thereby selectively altering the thermal conductivity of the electrostrictive material. The heat sink and thermal load are thereby selectively thermally coupled to each other in dependence on the control voltage.

10 Claims, 19 Drawing Sheets

(56) References Cited

U.S. PATENT DOCUMENTS

| | | | | |
|---|---|---|---|---|
| 7,755,899 | B2 * | 7/2010 | Stenmark | H01H 37/46<br>337/393 |
| 8,339,787 | B2 * | 12/2012 | Tsai | G06F 1/206<br>165/185 |
| 9,025,333 | B1 * | 5/2015 | Spowart | B64G 1/50<br>62/383 |
| 9,255,347 | B2 * | 2/2016 | Ihlefeld | C30B 29/32 |
| 9,699,883 | B2 * | 7/2017 | Dede | H01L 23/36 |
| 11,239,509 | B2 * | 2/2022 | Hussain | H01M 10/63 |
| 2004/0232893 | A1 * | 11/2004 | Odagawa | H10N 15/00<br>320/154 |
| 2009/0218087 | A1 * | 9/2009 | Oshima | F28F 13/00<br>252/73 |
| 2016/0102235 | A1 * | 4/2016 | Ihlefeld | C30B 29/22<br>423/594.8 |

* cited by examiner

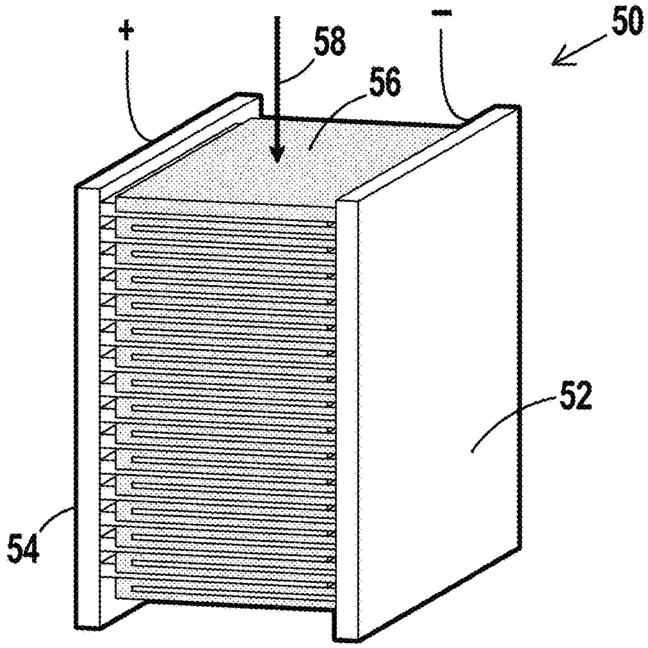
FIG. 5A
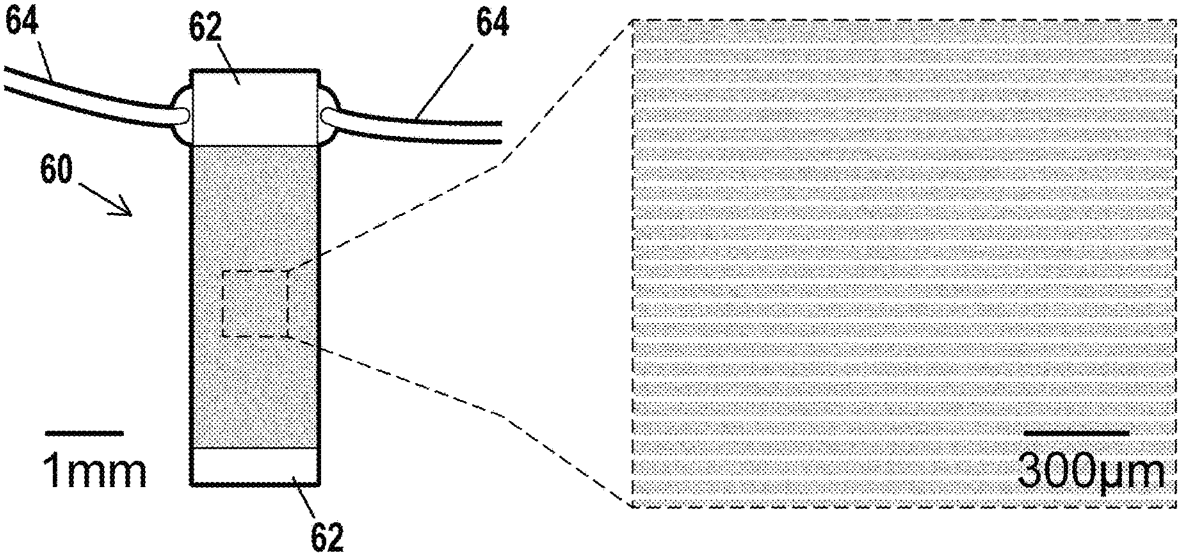
FIG. 5B
FIG. 5C

ELECTRICALLY CONTROLLED SOLID-STATE THERMAL SWITCH

CROSS-REFERENCE TO RELATED APPLICATIONS

The present application claims the filing benefit of co-pending U.S. Provisional Application Ser. No. 63/243,860 filed Sep. 14, 2021, the disclosure of which is incorporated by reference herein in its entirety.

GOVERNMENT RIGHTS

This invention was made with government support under grant/contract number 2011876 awarded by the National Science Foundation. The government has certain rights in the invention.

BACKGROUND

This invention generally relates to methods and devices for controlling a flow of heat, and, in particular, to electrically controlled solid-state thermal switches.

The need to control heat generated by electronic devices, in cooling applications, and for thermal energy harvesting has created a demand for thermal switches. A thermal switch is a device having a thermal conductivity that can be controlled by a non-thermal input. Traditionally, this input has been mechanical in nature, e.g., a force or movement that adjusts a physical separation between heat-carrying components. However, it would be advantageous to have an effective thermal switch that could be controlled in other ways. The concept of controlling heat via an externally applied magnetic field in ferromagnetic materials has been tried. However, devices using electromagnets have yet to produce a practical thermal switch.

"Phonon Transport in Barium Titanate" by Mante et al., *Physica* 52:4, 577-604 (1971) (hereinafter "Mante") discloses the thermal conductivity of bulk $BaTiO_3$ in the absence of an electric field. In the presence of an electric field of 11 kV/cm, Mante discloses that at a temperature of 5 K, the thermal conductivity increases fourfold when exposed to the electric field. However, there is no increase in conductivity above 100 K, thus limiting the disclosed system's usefulness. Mante et al. attempts to explain the observed effect by invoking the concept that, at such low temperature, phonons are dominantly scattered by ferroelectric domain walls. With the application of an electric field, the domains grow, the domain wall density decreases, and so does the scattering. However, at practical temperatures, phonons in bulk materials are dominantly scattered by other phonons. Thus, Mante teaches that the disclosed mechanism does not work at or above 100 K.

"Dependence of the Thermal Conductivity of $BiFeO_3$ Thin Films on Polarization and Structure" by Shuai Ning et al. presents a thermal conductivity study on thin film samples of $BiFeO_3$ (BFO) in the rhombohedral and tetragonal phase. Ning discloses very little field-dependency on thermal conductivity due to domain structure, but considerable dependency on the phase of the material.

"Room-Temperature Voltage Tunable Phonon Thermal Conductivity via Reconfigurable Interfaces in Ferroelectric Thin Films" by Jon Ihlefeld et al. *Nano Lett* 15, pp. 1791-1795 (2015) (hereinafter "Ihlefeld") discloses the thermal conductivity switching capabilities of a polycrystalline thin film configuration comprised of a $PbZr_{0.3}Ti_{0.7}O_3$ layer and a $PbZr_{0.7}Ti_{0.3}O_3$ layer. Both materials are derivatives of a lead zirconium titanate (PZT) (specifically $PbZr_{0.5}Ti_{0.5}O_3$) which is a ferroelectric material. At room temperature, the Ihlefeld paper discloses a thermal conductivity of about 1.17 W/mK at zero electric field, and a thermal conductivity of about 1.06 W/mK with an electric field of about 500 kV/cm, a change of about 10%. The Ihlefeld paper further shows this change to be reproducible and consistently having the same switching ratio. The authors attribute this to a change in phonon scattering on the domain walls based on the premise that the domain walls grow denser in an applied field. Thus, to utilize this effect for thermal switching, materials should be thinner than the phonon-free path which they estimate to be less than 100 nm at room temperature in complex oxides.

The U.S. Pat. No. 9,255,347 to Ihlefeld et al. claims "A method to control thermal conductivity in a ferroelectric material, comprising: growing an epitaxial or polycrystalline film of ferroelectric material on a substrate; and applying a sufficient electric field to the film to modify the domain structure in the film, thereby altering the thermal conductivity of the film." This claim is consistent with the teachings in the Ihlefeld paper discussed above, which apply only to thin films.

The experimental results in Ihlefeld and Ning have inspired additional papers on the physical origins of the electric field dependence of the thermal conductivity of ferroelectric materials.

For example, "A phononic switch based on ferroelectric domain walls" by Juan Seijas-Bellido et al. investigates the role of domain wall behavior in modulating heat flow in $PbTiO_3$. Using atomistic computational and molecular dynamics simulations, they study the quantitative nature of the thermal resistance of a domain wall, asserting this is the cause of the difference in the high and low thermal conductivity states. They compute that a single domain wall can increase thermal resistance by 20%.

"Electric-Field-Controlled Thermal Switch in Ferroelectric Materials Using First-Principles Calculations and Domain-Wall Engineering" by Chenhan Liu et al. theorizes about the origins of the change in thermal conductivity of ferroelectric materials in zero and finite fields. The paper identifies two competing mechanisms at play: phonon-phonon and domain wall scattering. Liu et al. refers to the three experimental papers, Mante et al., Ning et al., and Ihlefeld et al., asserts that their explanations contrast each other, and contends that the discrepancies may be due to residual strain, substrate strain, domain size, defects, impurities, and unique material characteristics. Using $PbTiO_3$ as the ideal ferroelectric material, Liu et al. calculates the thermal conductivity under multiple conditions using first-principles calculations. Lui et al. suggest the experimental differences in PZT and BFO thin films may be due to differences in substrate strain.

The above articles all teach that the origin of the electric field dependence of the thermal conductivity of ferroelectrics is domain wall scattering. Thus, the above cited references all teach that electrically actuated ferroelectric thermal switches operating at room temperature can only be made as thin films, e.g., films having a thicknesses of 100 nm or less.

Improving thermal switches is of more than academic interest. Over 70% of the energy humanity uses comes from thermal sources, so devices that actively and dynamically control heat are technologically important. Heat switches control, direct, or pause heat flow in a system. They enable the creation of thermal rectifiers, thermal transistors, heat controllers, and more. Thus, there is a need for improved materials and devices to control thermal flow. In particular, an electrically controlled solid-state thermal switch capable of operating over a wide temperature range, including at higher temperatures, could improve the performance of many technologies involving the control of thermal flow.

SUMMARY

In an aspect of the disclosure, a solid-state electrically controlled thermal switch is disclosed. The thermal switch includes an electrostrictive material having a plurality of faces, a first electrode operatively coupled to a first face of the plurality of faces, a second electrode operatively coupled to a second face of the plurality of faces different from the first face, a first thermal coupler operatively coupled to a third face of the plurality of faces, and a second thermal coupler operatively coupled to a fourth face of the plurality of faces different from the third face. The first and second electrodes are configured to apply an electric field to at least a portion of the electrostrictive material in response to a voltage being applied across the first and second electrodes. The third and fourth faces define a thermal path through the electrostrictive material that includes at least a part of the portion of the electrostrictive material across which the electric field is applied. Applying the electric field to at least the portion of the electrostrictive material selectively alters a thermal conductivity of the thermal switch.

In an embodiment of the disclosed thermal switch, the electrostrictive material may include one of a plurality of layers of electrostrictive material each having the third face and the fourth face, the first electrode may include a plurality of first conductive layers, and the second electrode may include a plurality of second conductive layers. The third face of each layer of the plurality of layers of electrostrictive material may be operatively coupled to a respective first conductive layer, the fourth face of each layer of the plurality of layers of electrostrictive material may be operatively coupled to a respective second conductive layer, and the plurality of layers of electrostrictive material, the plurality of first conductive layers, and the plurality of second conductive layers may define a stack of alternating layers of the electrostrictive material and the first and second conductive layers.

In another embodiment of the thermal switch, a smallest dimension of the electrostrictive material may be at least one micron.

In another embodiment of the thermal switch, the electrostrictive material may include a ferroelectric material.

In another embodiment of the thermal switch, the ferroelectric material may include a perovskite ferroelectric.

In another embodiment of the thermal switch, the perovskite ferroelectric may include a rhombohedral perovskite ferroelectric, a tetragonal perovskite ferroelectric, or an orthorhombic perovskite ferroelectric.

In another embodiment of the thermal switch, the ferroelectric material may be selected from the group consisting of $(Pb,La)(Zr,Ti,Nb)O_3$, $BaTiO_3$, $BiFeO_3$, $(Ba,Sr)TiO_3$, $(Ba,Ca,Sr)TiO_3$, $(Ba,Sr)(Ti,Zr)O_3$, $(Ba,Sr,Ca,Pb)(Ti,Zr,Hf,Sn)O_3$, $LiNbO_3$, and $(Bi,RE)FeO_3$, wherein RE is a lanthanide metal cation.

In another embodiment of the thermal switch, a temperature of the ferroelectric material may be below a Curie temperature of the ferroelectric material.

In another embodiment of the thermal switch, the electrostrictive material may be a single-crystal or a polycrystalline material.

In another embodiment of the thermal switch, the electrostrictive material may include a paraelectric material.

In another embodiment of the thermal switch, the first face of the plurality of faces may at least partially coincide with the third face of the plurality of faces, and the second face of the plurality of faces may at least partially coincide with the fourth face of the plurality of faces. At least a portion of the first thermal coupler may be operatively coupled to the first face of the electrostrictive material through at least a portion of the first electrode, and at least a portion of the second thermal coupler may be operatively coupled to the second face of the electrostrictive material through at least a portion of the second electrode.

In another embodiment of the thermal switch, the thermal switch may further include a first dielectric layer positioned between the first thermal coupler and the first electrode, and a second dielectric layer positioned between the second thermal coupler and the second electrode. The first dielectric layer may be configured to thermally couple the first thermal coupler to the first electrode and electrically insulate the first thermal coupler from the first electrode. The second dielectric layer may be configured to thermally couple the second thermal coupler to the second electrode and electrically insulate the second thermal coupler from the second electrode.

In another aspect of the disclosure, a method of controlling heat flow between a thermal load and a heat sink is disclosed. The method includes thermally coupling the thermal load to the first face of the electrostrictive material, thermally coupling the heat sink to the second face of the electrostrictive material, and selectively applying the electric field to at least the portion of the electrostrictive material, wherein the electric field alters the thermal conductivity of at least the portion of the electrostrictive material.

In an embodiment of the disclosed method, selectively applying the electric field to at least the portion of the electrostrictive material may alter a flow of heat from the thermal load into the heat sink, or the flow of heat from the heat sink into the thermal load.

In another embodiment of the disclosed method, selectively applying the electric field to at least the portion of the electrostrictive material may include modulating an amplitude of the electric field.

In another embodiment of the method, the smallest dimension of the electrostrictive material may be at least one micron.

In another embodiment of the method, the electrostrictive material may be the ferroelectric material.

In another embodiment of the method, the ferroelectric material may be selected from the group consisting of $(Pb,La)(Zr,Ti,Nb)O_3$, $BaTiO_3$, $BiFeO_3$, $(Ba,Sr)TiO_3$, $(Ba,Ca,Sr)TiO_3$, $(Ba,Sr)(Ti,Zr)O_3$, $(Ba,Sr,Ca,Pb)(Ti,Zr,Hf,Sn)O_3$, $LiNbO_3$, and $(Bi,RE)FeO_3$, wherein RE is a lanthanide metal cation.

In another embodiment of the method, the electrostrictive material may be a single-crystal or a polycrystalline material.

In another embodiment of the method, the electrostrictive material may include a paraelectric material.

The above summary presents a simplified overview of some embodiments of the invention to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIGS. 5A-5C depict additional schematic, perspective, and front views of the device of FIG. 1.

DETAILED DESCRIPTION

Figure 1A:
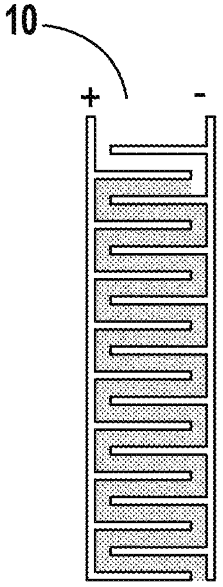
FIGS. 1A-1C depict a schematic view, a perspective view, and a front view, respectively, of a stack of alternating conductive and ferroelectric layers.

Efficient thermal switches have numerous applications. In particular, thermal switches can be used in solid-state refrigeration cycles using electro-caloric or magneto-caloric materials. Because these cycles do not incur the irreversible thermodynamic losses that thermoelectric refrigeration undergoes, they can be much more efficient than Peltier cooling.

Thermal switches may also be used in solar thermal installations. Since the sun's power varies between day and night, solar thermal cycles work across temperature differences that vary over time. Thermal switches combined with heat sinks may allow for load leveling. Further, they may be used to increase the temperature difference across which a Rankine cycle that generates power from solar heat can operate. This in turn may increase the cycle's thermodynamic efficiency.

Another application for thermal switches is waste heat scavenging. In waste heat scavenging applications in which the amount of waste heat changes over time (e.g., automotive exhaust systems), thermal switches combined with heat sinks may enable thermal load leveling. Thermal load leveling may increase the maximum temperature difference between the hot and cold part of the waste heat recovery system. This increases the thermodynamic efficiency of waste heat recovery systems of any design, whether based on thermoelectric effects, or on Stirling or Rankine cycles.

Thermal switches may also be used in electronic cooling systems. Heat can damage parts and decrease the lifetime of devices, which means more budgeting for electronics in industry and government, alike. The recent shortage of semiconductors makes this even more vital to modern society. Thermal switches may enable rapid transient cooling that addresses transient problems without increasing the overall cooling requirements of the entire system.

Some embodiments of the present invention advantageously apply a new mechanism based on external control of the lattice thermal conductivity. Experimental results show a 4 to 5 times larger effect of the electric field on thermal conductivity κ(E) at room temperature compared to previously measured values. The fundamental understanding of the physical principles for an electric-field actuated phonon-based heat switch disclosed herein enables the engineering of more efficient devices.

Ferroelectric materials are materials that exhibit spontaneous electric polarization which can be reversed by applying an electric field. Known ferroelectric materials include, but are not limited to, Lead Zirconate Titanate (PZT), triglycine sulphate ($(NH_2CH_2COOH)_3$—$H_2SO_4$), polyvinylidene fluoride (PVDF), lithium tantalite ($LiTaO_3$), potassium sodium tartrate tetrahydrate ($KNaC_4H_4O_6$-$4H_2O$), potassium dihydrogen phosphate ($KH_2PO_4$); barium titanate ($BaTiO_3$), lithium niobate ($LiNbO_3$), potassium niobate ($KNbO_3$), lead zirconate titanate ($PbZr_{1-x}Ti_xO_3$), lead titanate ($PbTiO_3$), lead zirconate ($PbZrO_3$), guanidine aluminum sulphite hexahydrate ($C(NH_2)_3Al(SO_4)_2$-$6H_2O$), lead bismuth niobate ($PbBi_2Nb_2O_9$), strontium bismuth tantalate ($SrBi_2Ta_2O_9$), barium strontium titanate ($Ba_{0.73}Sr_{0.27}TiO_3$), and bismuth titanate ($Bi_4Ti_3O_{12}$).

Embodiments of the invention use ferroelectric ordering in ferroelectric materials to control heat flow based on scattering mechanisms, phonon physics, and dipole interactions in these complex materials. This process of exploiting ferrons in ferroelectric materials can be viewed as analogous to using magnetic fields to change thermal conductivity in ferromagnetic materials (e.g., YIG), a process that leverages the existence of magnons. It has been determined that a magnetic field stiffens the spin waves (magnons), thereby decreasing the thermal conductivity of certain ferromagnetic materials. In a high enough magnetic field, the contribution of the magnons can be calculated based on the zero-field value. Below 10 K, an approximate 3-5% change in thermal conductivity has been observed in response to application of a magnetic field. Similar changes in the thermal conductivity of ferroelectric materials with applied electric field have also been observed experimentally. However, these results have been solely ascribed to scattering of phonons on domain walls. As a result of this misunderstanding of the underlying mechanism, the conventional wisdom is that ferroelectric thermal switches which operate at room temperature can only be made from thin-film materials, e.g., materials with thicknesses of 100 nm or less. In contrast, embodiments of the present invention include thermal switches made from bulk ferroelectric materials, e.g., materials with micron-scale and larger thicknesses.

Figure 1B:
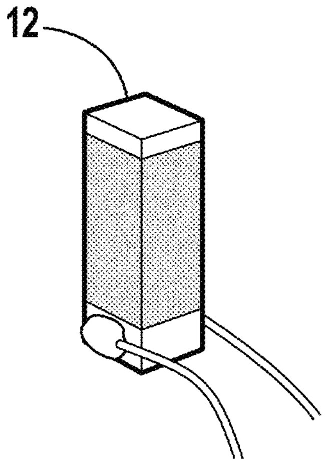
Figure 1C:
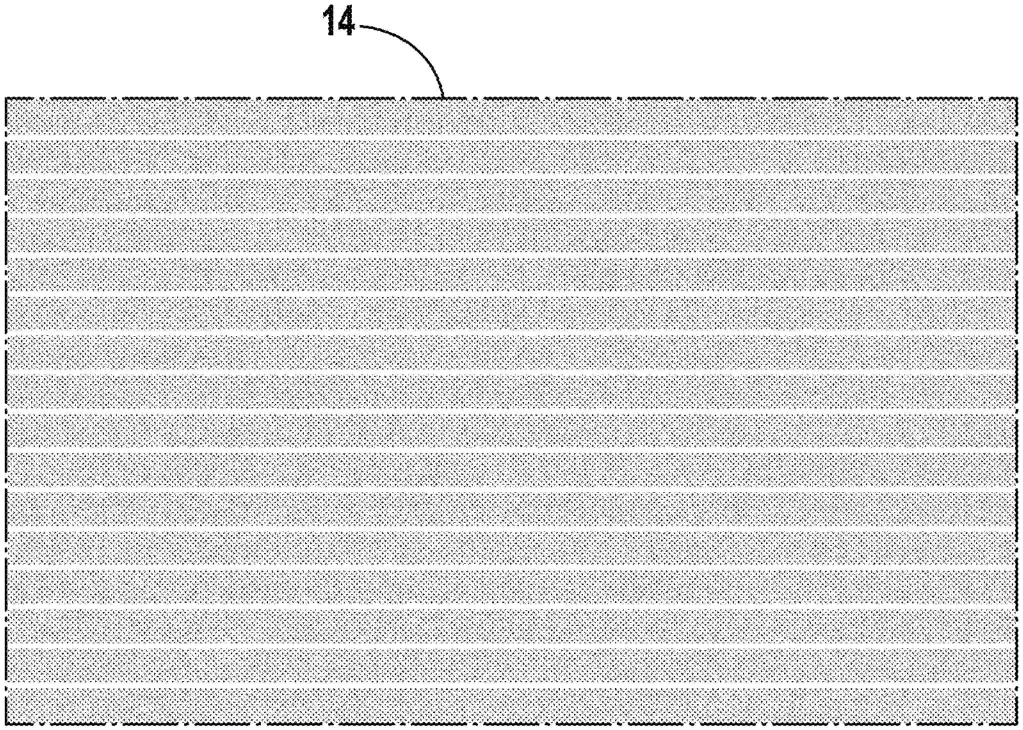

FIG. 1 illustrates device comprising a stack of bulk PZT in schematic form 10, as a macroscopic perspective view of a sample studied for thermal conductivity 12, and a microscopic front view 14 showing the alternating silver (Ag) and PZT layers of the device. The depicted piezoelectric actuator stack is based on bulk P5-8Y PZT material. Chemical analysis by inductively-coupled plasma indicates the composition of the PZT as Pb $[Ti_{0.37}Zr_{0.24}Nb_{0.25}Ni_{0.14}]O_3$ with an uncertainty of ±11% on the stoichiometry. The stack has a maximum working voltage of 100 V. The stack consists of 60 interdigitated Ag—Pd contacts, each sandwiching a layer of PZT about 48 μm thick. The width and thickness of the stack are both 1.65 mm.

Figure 2:
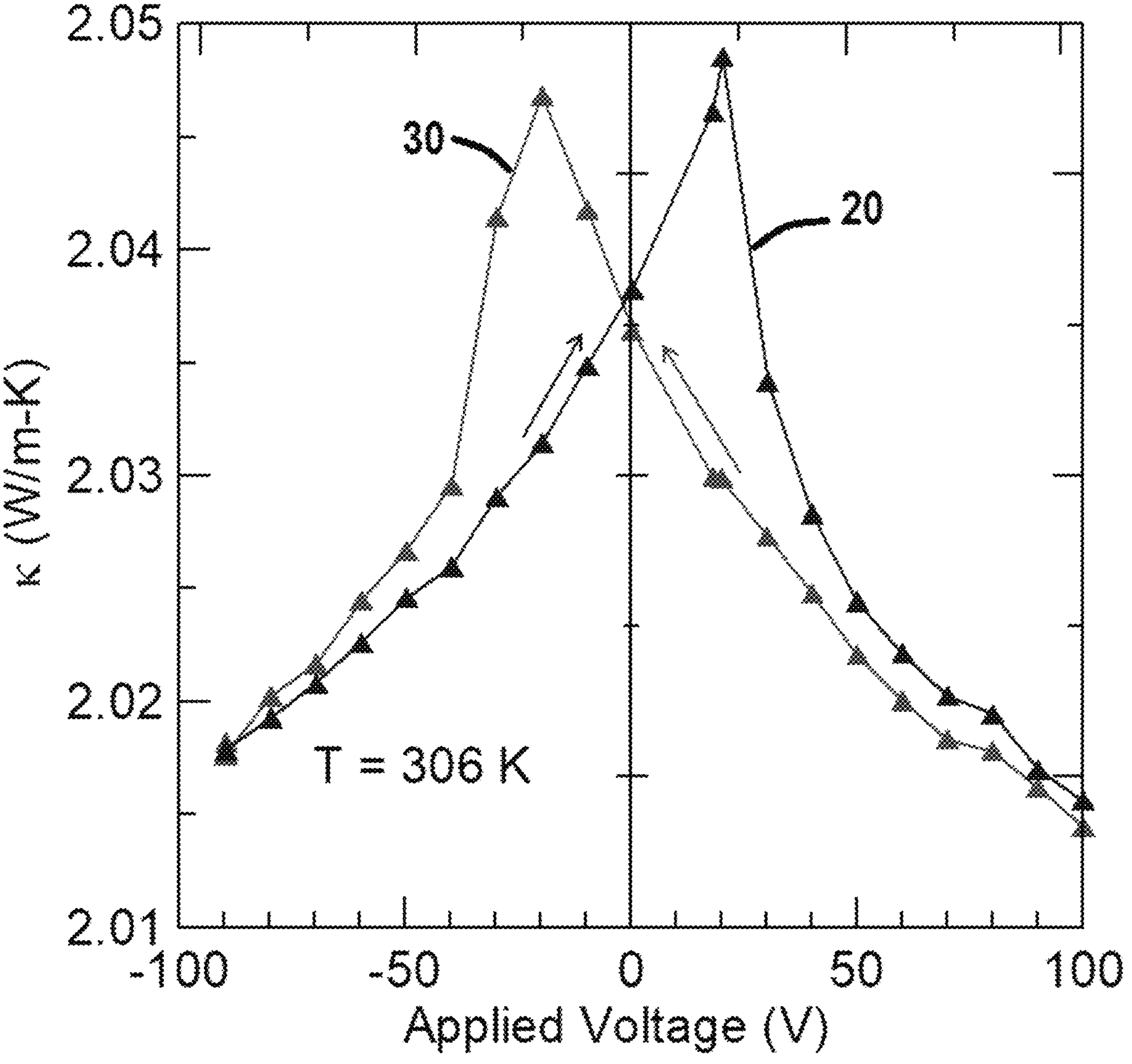
FIGS. 2 and 3 depict graphical views of thermal conductivity versus applied voltage for increasing and decreasing voltages applied to the stack of FIG. 1.
Figure 3:
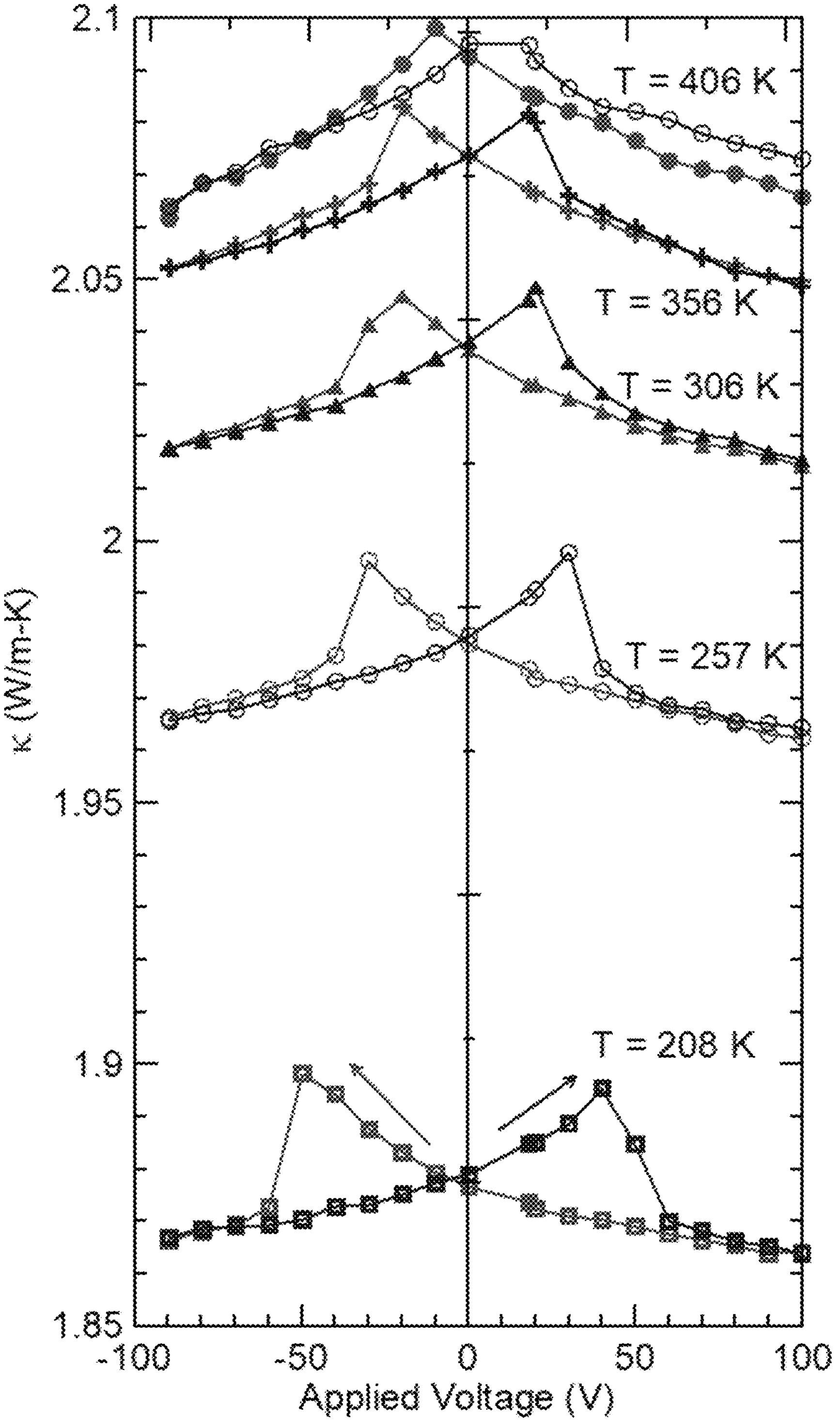

FIG. 2 depicts a graph illustrating thermal conductivity data κ(E) versus voltage at 306 K, with heat losses and the contribution of the Ag electrodes subtracted. Plot 20 shows the behavior as the applied voltage is increased, and plot 30 shows the behavior as the applied voltage is decreased. FIG. 3 depicts a graph that shows the thermal conductivity measurements for several temperatures 208 K<T<406 K. The thermal conductivity increases with increasing temperature T, but the sensitivity of the thermal conductivity to voltage is generally temperature-independent. The coercive electric field $E_C$ may change noticeably with temperature, e.g., from about 45 V at T=208 K to about 10 V at T=406 K. The percent difference between $\kappa_{min}$ and $\kappa_{max}$ is about the same so that the switching ratio is generally temperature-independent. Below 150 K, the maximum working voltage was not sufficient on this exemplary device to completely switch the polarization in the sample and only minor loops in the hysteresis were observed.

It can be seen experimentally that the field dependence of κ(E) is similar to that of the dielectric constant (the susceptibility of the polarization to electric field at low electric field) $\chi_E(E)$ of the PZT material used. Here the electric field E is obtained by dividing the applied voltage by the distance between the electrodes in the stack. Because phonon scattering does not enter $\chi_E(E)$, this similarity may indicate that scattering of phonons is not the main origin of the field dependence of κ(E) in this instance. An alternative theory that explains these observations and does not rely on scattering of phonons on domain walls is therefore needed. The thermal fluctuations of the polarization may transport polarization density in a process analogous to that found in ferromagnetic materials where the thermal fluctuations of the magnetization (magnons) transport magnetization flux. By analogy with magnons, which possess a magnonic specific heat and have a thermal conductivity, the thermal fluctuations of the electric polarization in ferroelectrics should also have a specific heat and a thermal conductivity. The ferroelectric analog to the magnon in ferromagnetic material is proposed to be a dipole wave, or "ferron". Thus, these ferrons may be contributing to thermal conductivity. Physically, ferrons are a subset of the phonon population that involve the movements of the atoms in the solid that are involved in the formation of the dipole moments at the atomic level, and thus the polarization at the macroscopic level. Like magnons, ferrons stiffen in the presence of an applied field, thereby transporting less heat and decreasing the thermal conductivity. Thus, while residual strain, domain wall scattering, etc., may play a role, the primary mechanism is believed to be the suppression of ferrons in the system. This phenomena applies to bulk ferroelectrics, not just thin films. As discussed in detail below, experimental data carried out on a bulk sample of ferroelectric material supports the ferron model.

Magnetism and ferroelectricity, the ordered states of magnetic and electric dipoles in solids respectively, are two phases of condensed matter that have much in common. Both orders can be very robust above room temperatures, and are used in non-volatile memories. The changes in entropy associated with both orders form the basis of magnetocaloric and electrocaloric technologies. Magnons, the quanta of the elementary excitations of the magnetic order, carry momentum, energy, and magnetization currents. By analogy, "ferrons" refer to the quanta of the elementary excitations of the electric polarization in ferroelectrics. The electric dipole $p_k$ (or electric polarization) of a single ferron with linear momentum k and energy dispersion $\varepsilon_k$ can be written in terms of the following derivative with respect to an external electric field E, $p_x=\partial\varepsilon_k/\partial E$. This equation for $p_k$ is similar to the magnetization $m_k$ (or spin polarization) of a single magnon with linear momentum k and energy dispersion $\varepsilon_k$, which can be written in terms of a derivative with respect to an external magnetic field H. Here, we use the operational definition of ferrons as being quasiparticles with finite electric polarization $p_k\neq 0$.

Ferrons are responsible for a decrease of the saturation polarization with increasing temperature. A temperature gradient applied to a ferroelectric therefore not only drives a heat flux $j_Q$, but also a polarization flux $j_P$, since the polarization at the hot side of the sample is lower than at the cold side. The latter is a nonequilibrium net flow of electric dipoles that should not be confused with the shift current in electrocaloric effects. The mixed transport of $j_P$ and $j_Q$ under applied effective electric field E and temperature T gradients obeys the Onsager relation:

$$\begin{pmatrix} -j_P \\ j_Q \end{pmatrix} = \sigma \begin{pmatrix} 1 & \Pi/T \\ \Pi & \kappa/\sigma \end{pmatrix} \begin{pmatrix} \partial E \\ -\partial T \end{pmatrix} \quad \text{(Eqn. 1)}$$

where Π is the polarization Peltier coefficient $\Pi=-j_Q/j_P|_{\nabla T=0}$ while σ and κ are the polarization and thermal conductivity, respectively. The Onsager relation is macroscopic and does not depend on a specific microscopic mechanism.

In the majority of known ferroelectrics, the polarization is associated with the physical motion of charged ions or molecules, e.g., phonons. In one model, the polarization Peltier coefficient is related to the susceptibility $\chi_E$ of the material by $$\chi_E=dP_0/dE|_{\nabla T=0}=k_BT/a^3\Pi^2$$

where $P_0$ is the equilibrium polarization and a is the lattice constant. Also in that model, the electric-field dependent thermal conductivity depends on E as $\kappa=\kappa_0(1+E/\Pi)$. The concept of polarization-carrying phonons may be extended to displacive ferroelectrics (e.g., such as $BaTiO_3$) focusing on the polarization arising from the motion of titanium atoms vis-à-vis the oxygen octahedral cage.

Figure 4A:
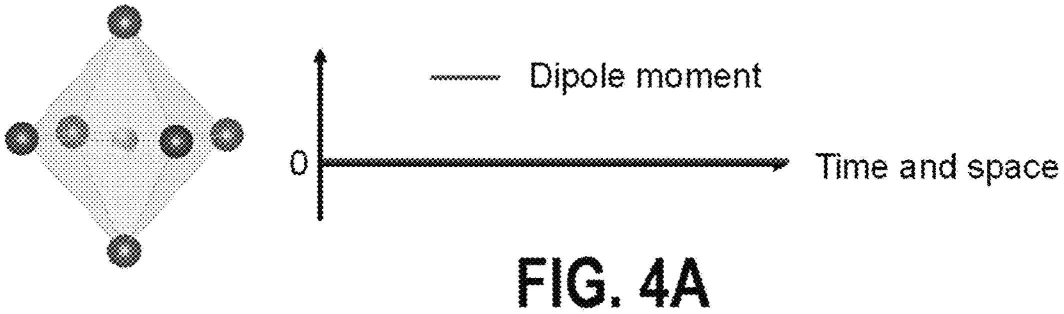
FIGS. 4A-4D depict schematic views of a ferron in a displacive ferroelectric material.
Figure 4B:
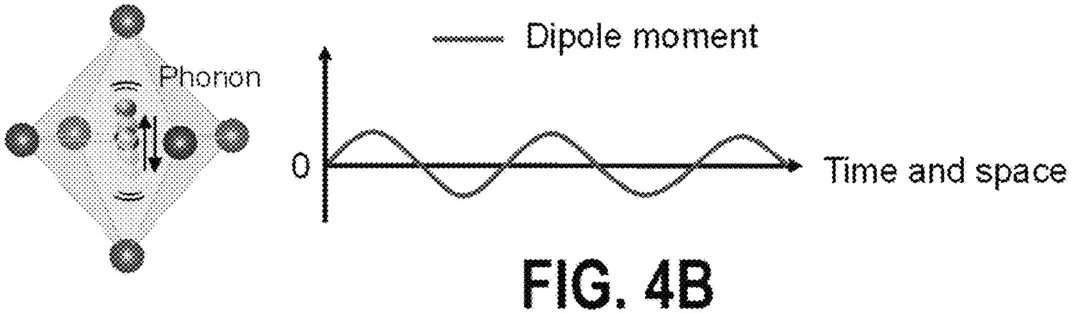
Figure 4C:
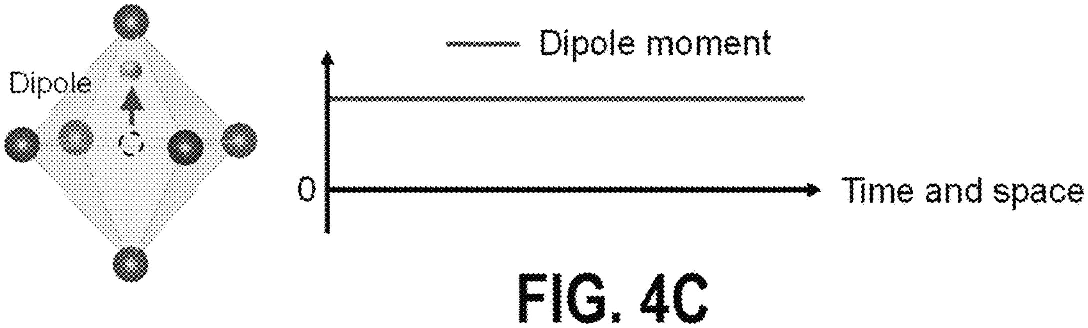
Figure 4D:
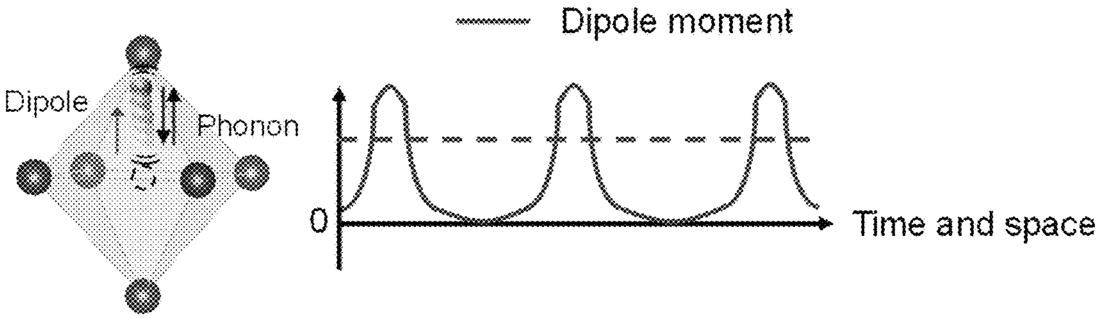

FIGS. 4A-4D depict a schematic representation of a ferron in a displacive ferroelectric. An atomic representation and resulting dipole moment of a ferroelectric $BaTiO_3$, where the larger outer spheres represent atoms of $O^{2-}$ and smaller inner sphere represents an atom of $Ti^{4+}$. FIG. 4A illustrates the average atomic positions above the critical temperature, FIG. 4B illustrates a symmetric soft optical phonon excitation, FIG. 4C illustrates a polarized ferroelectric at $T<T_c$, in which a net polarization (single upward arrow) arises from a shift of the average position of the Ti ions, and FIG. 4D illustrates a typical ferron excitation of a polarized ferroelectric. The ferron reduces the net polarization because the ions oscillate in a non-linear way around the equilibrium position (dashed line).

FIGS. 4A and 4B illustrate the average ion position and the optical phonon above the ordering temperature $T_C$. As shown by FIG. 4C, in a polarized material below $T_C$, an ion in these solids is slightly displaced from its equilibrium position. The restoring force then becomes asymmetric around the equilibrium position of the atoms. FIG. 4D illustrates schematically the atomic motion associated with the anharmonic polar phonon (i.e., ferron) in a polarized ferroelectric. Such a ferron transports polarization because the ions oscillate in a non-linear way about the equilibrium position that reduces the equilibrium dipole moment. For large effects, such phonons should be very anharmonic. In displacive ferroelectrics, the polar phonon modes are optical, while acoustic modes dominate the heat and polarization transport because they have much higher group velocities. Here we find that an electric field mixes the optical and acoustic modes by electrostriction, leading to a field-dependent sound velocity and transport properties. Exemplary embodiments disclosed herein use PZT, in which the polarization involves the motion of the Pb atoms. This is difficult to visualize schematically, however the precise phonons involved in the polarization in $PbTiO_3$ are described in detail by Y. Fu, D. J. Singh, "Thermal conductivity of perovskite $KTaO_3$ and $PbTiO_3$ from first principles", *Physical Review Materials* 2, (2018) (hereinafter "Y. Fu"), the disclosure of which is incorporated by reference herein in its entirety.

The measured temperature and electric-field-dependent thermal conductivity κ(E,T), thermal diffusivity D(E,T) ≡κ/C (where C is the volumetric specific heat), longitudinal acoustic phonon velocity $v_{LA}(E)$ at 290 K, and susceptibility $\chi_E(E,T)$ of a piezoelectric actuator stack made from bulk PZT with interdigitated electrodes are described below. A coherent and quantitative model that explains the logarithmic field dependences κ'/κ, D'/D, and v'/v, where $\kappa'\equiv\partial\kappa/\partial E|_T$, $D'\equiv\partial D/\partial E|_T$, and $v'\equiv\partial v/\partial E|_T$ is also described. In this model, the electric field affects the phonon dispersion by electrostriction (quantified by the piezoelectric coefficients $d_{33}$ and $d_{31}$) and anharmonicity (quantified by the Grüneisen parameters). This leads to a change in the thermal transport properties. The model explains the data very well without invoking any adjustable parameters.

The change in thermal conductivity may be induced by an electric field that polarizes the optical modes and by electrostriction, which polarizes the acoustical phonons by hybridization with the optical phonons. Accordingly, although polarization in the material is largely described above as being caused by an ordered ferroelectric phase, other mechanisms may be able to induce polarization in thermal switches. For example, the polarization may also be induced by the applied electric field in an electrically insulating material that has a non-zero electrostrictive coefficient, i.e., "electrostrictive materials". Electrostrictive materials are a class of materials which, upon the applications of an electric field, develop strain as the result of the displacement of ions in the crystal lattice. Electrostrictive materials include, but are not limited to, ferroelectric materials and paraelectric materials. In addition, it should be further understood that the optimal orientation of the electric field with respect to the heat flux may vary, and that at least some electrostrictive materials may be agnostic to the orientation of the direction of the electric field as compared the direction of the heat flux. That is, the change in thermal conductivity κ(E,T) due to the electric field may be non-directional in nature.

Experimental Results

Figure 13A:
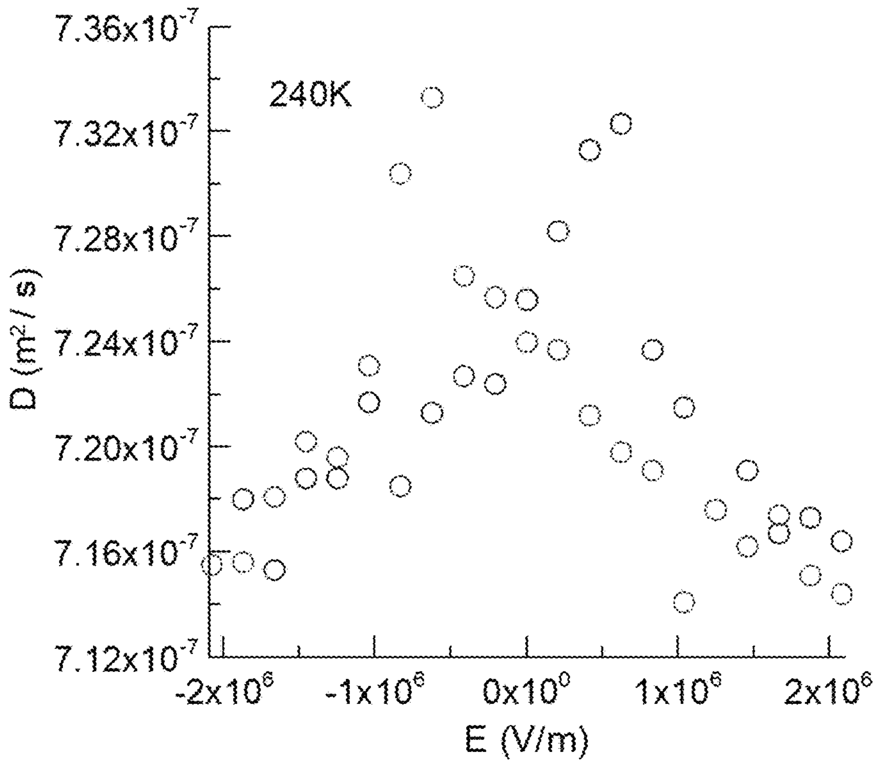
FIGS. 13A-13C depict graphical views of thermal diffusivity versus electric field for a sample of ferroelectric material at different temperatures.
Figure 13B:
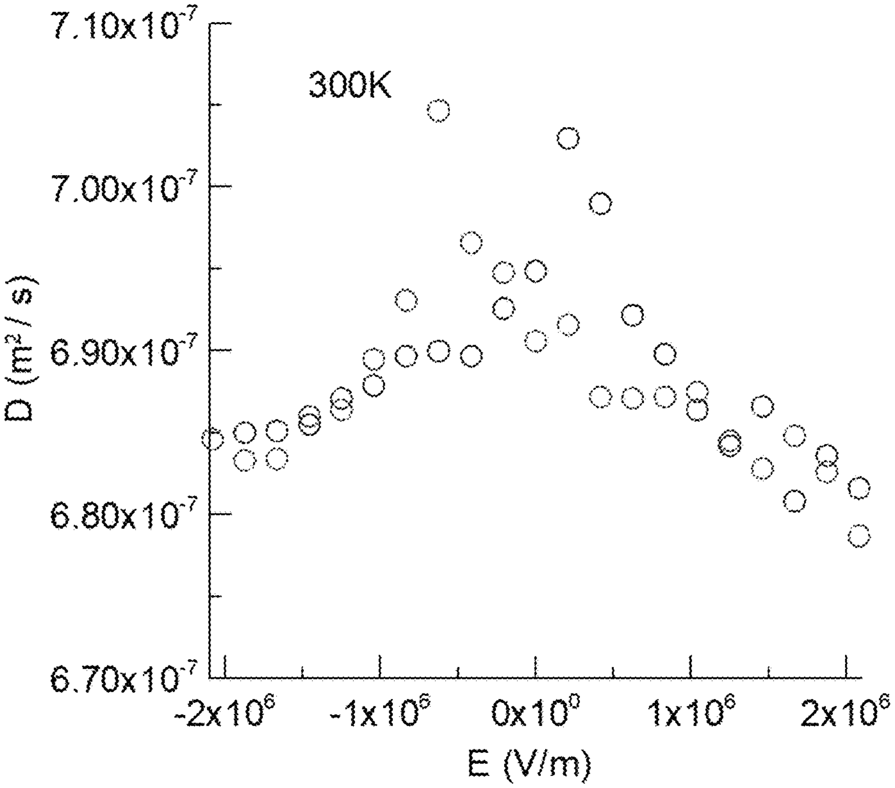
Figure 13C:
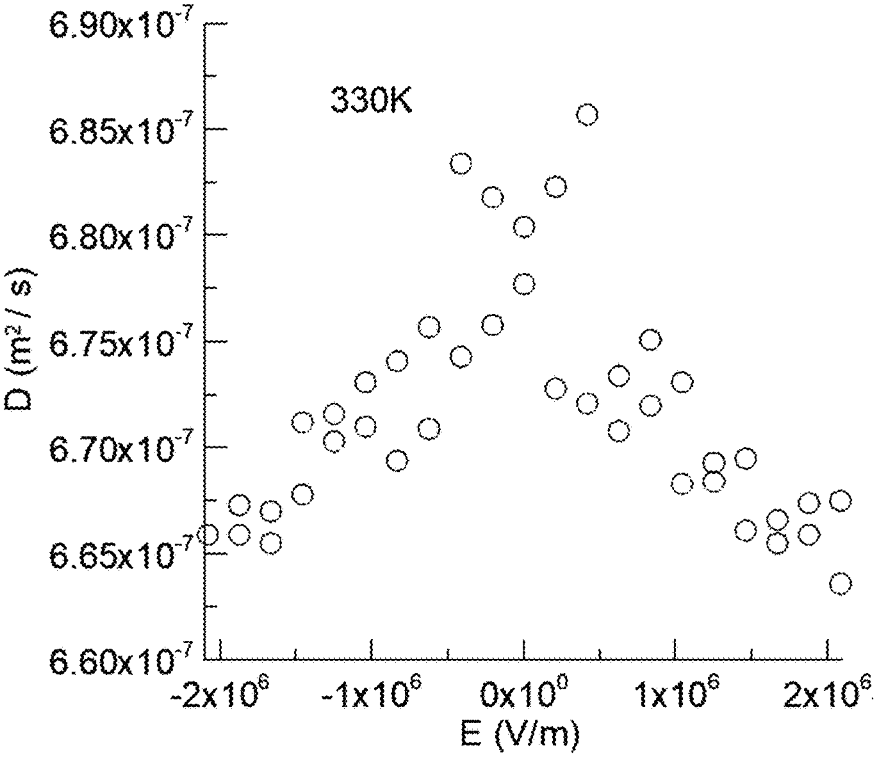
Figure 14:
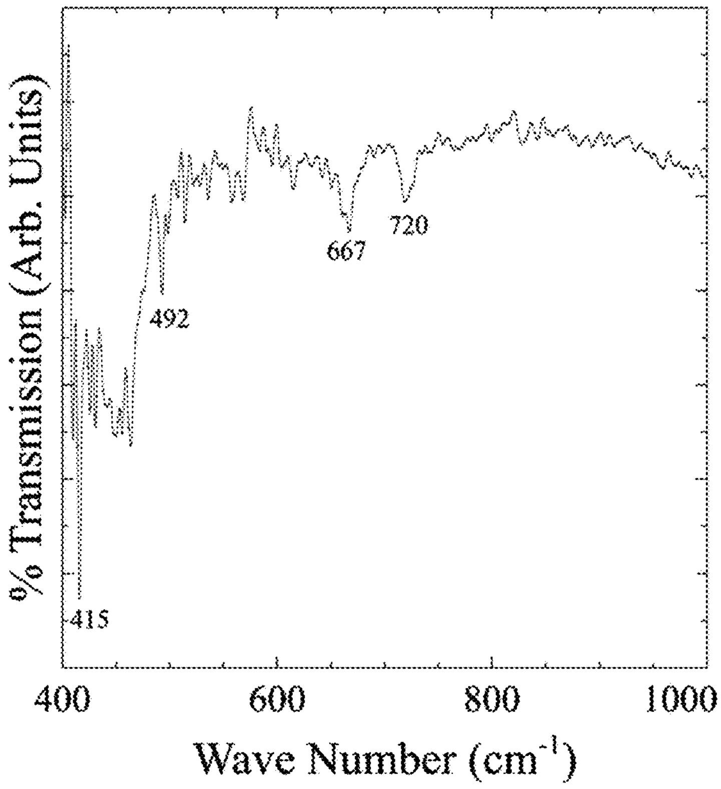
FIG. 14 depicts a graphical view of the infrared transmission spectrum of the ferroelectric material of FIG. 1.

A PZT-based actuator with interwoven Ag electrodes and a working voltage of 100 V was obtained from the TailKuKe Daytimebuy Store (item no. 603126). Manufacturer specifications include a mechanical quality factor $Q_m=90$ and a piezoelectric coupling coefficient $d_{33}=435\times10^{-12}$ m/V. Chemical analysis by inductively-coupled plasma gave a composition of the PZT to be Pb $[Ti_{0.37}Zr_{0.24}Nb_{0.25}Ni_{0.14}]O_3$ with an uncertainty of ±11% on the stoichiometry. This data was reproduced on other samples. FIGS. 3, 8, 12A, and 12B depict graphs illustrating field and temperature dependence of thermal conductivity on a second sample, and FIGS. 13A-13C depict graphs illustrating the electric field dependence of thermal diffusivity of a third sample at several temperatures. In the depicted graphs, the electric field dependence sweeps through the hysteresis loops, and the coercive electric field $E_C$ exceeds the maximum field that could safely be applied to the sample under test at T<160 K. Accordingly, in FIG. 12A, only one branch of the hysteresis loop is shown at 158 K and below. FIG. 14 depicts a graph illustrating the infrared transmission spectrum of the P5-8Y material. Previous measurements in academic journals show an optical vibrational phonon mode frequency at 410 $cm^{-1}$ for bulk PZT and at 420 $cm^{-1}$ for thin films. FIG. 14 depicts the frequency to be 415 $cm^{-1}$. The depicted measurement was taken on a Perkin Elmer Frontier Dual Range FIR/MidIR spectrometer, and the variations from known measurements are believed to be due to the different composition of the PZT used to obtain the present experimental data.

The stack of the sample under test consists of approximately 60 interdigitated Ag—Pd contacts, each sandwiching a layer of PZT about 48 μm thick. The width and thickness of the stack were both 1.65 mm. Polymer coatings on the stack were removed prior to mounting.

FIG. 5A depicts a schematic of a piezoelectric stack 50 representative of the sample under test including a plurality of digitated silver electrodes 52, 54 and PZT layers 56. A single headed arrow 58 indicates the direction of flow of heat flux. The coercive electric field $E_C$ is considered to be positive when aligned with the polarization of the PZT material. In each layer between one pair of interdigitated electrodes, both the field and the polarization alternate polarity, so the electric field keeps the same polarity throughout the stack. The dimensions of the un-encapsulated stack are about 1.65×1.65×3.69 mm. FIG. 5B shows a device 60 including the stack 50 encapsulated in a polymer 62 and with electrical leads 64 operatively coupled to the electrodes 52, 54. FIG. 5C depicts a micrograph of a portion of the stack showing the electrodes (bright lines) and PZT material (dark areas) of the lead zirconium titanate-based actuator used in the experiments. The micrograph was taken with an infrared camera to emphasize the contrast. The distance between the interdigitated electrodes is about 48 μm, which is several hundred times as thick as a typical thin film, and thus behaves as a bulk material.

Figure 6A:
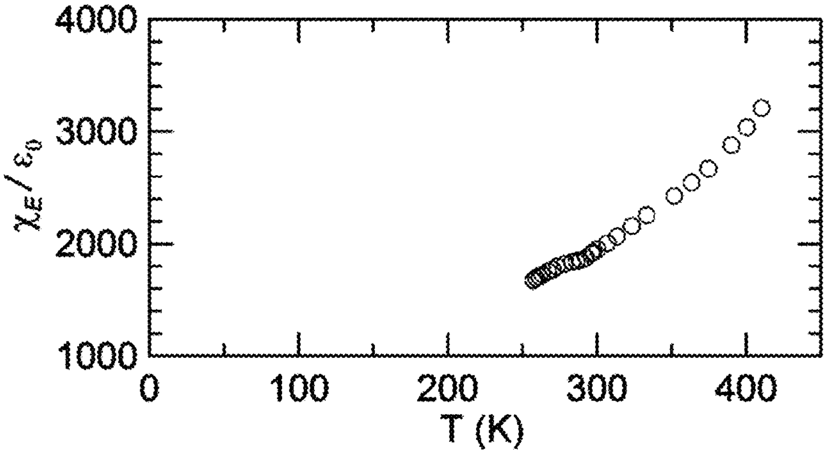
FIG. 6A depicts a graphical view of the low-field susceptibility of the stack of FIG. 1.
Figure 6B:
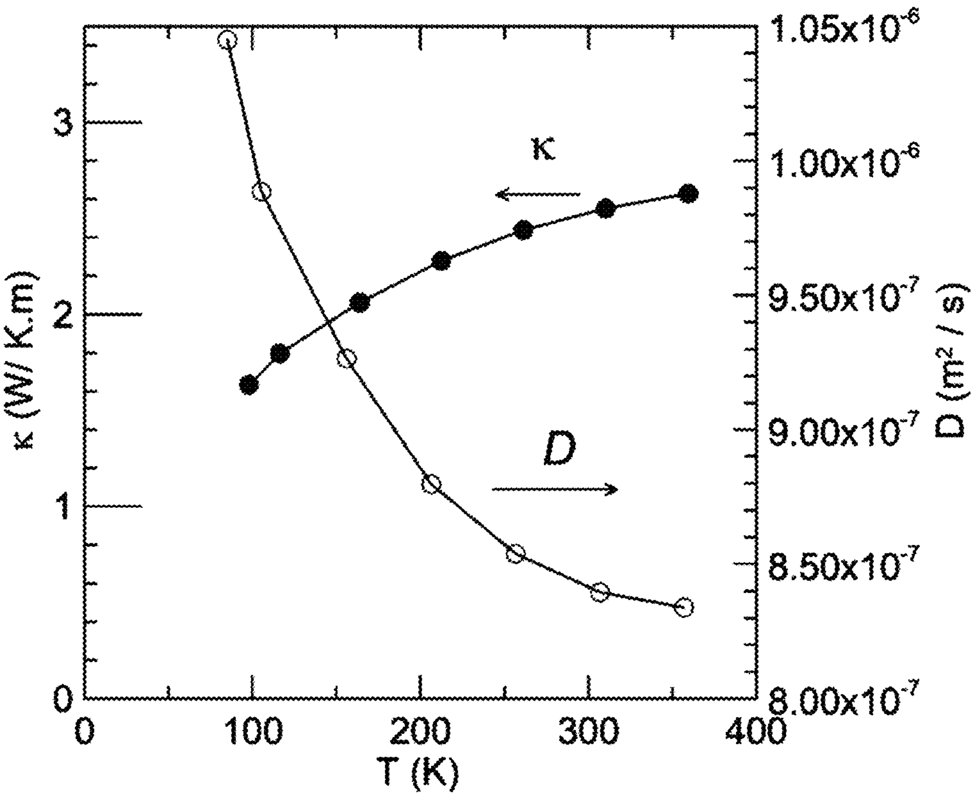
FIG. 6B depicts a graphical view of the thermal conductivity and thermal diffusivity of the stack of FIG. 1 versus temperature at zero electric field.

FIG. 6A depicts a graph illustrating the low-field susceptibility $\chi_E(E=0,T)$ of the unpolarized stack 50. FIG. 6B depicts a graph including a plot showing the thermal conductivity measured using a static heater-and-sink method a plot showing diffusivity D, both at zero electric field. The measurements cover temperatures from 97 to 359 K and are corrected for the Ag electrode contribution and heat loss during the experiment. The interfacial thermal resistance between the electrodes 52, 54 and the PZT layers 56 in the stack 50 was measured separately using the time-domain thermoreflectance method and was shown to increase the total thermal resistance by no more than 1.3%. The value of the thermal conductance κ is about half that of $PbTiO_3$ at 350 K. This, and the fact that the slope dκ/dT of the ceramic alloy studied here is positive, while that of $PbTiO_3$ is negative, indicates that alloy scattering of the heat-carrying phonons dominates at this temperature. Because the equipment did not allow a measurement of the heat capacity as a function of electric field, the thermal diffusivity of the samples was measured directly using the Ångström method. The Ångström method is described in detail by Carslaw, H. S. & Jaeger, J. C., "Conduction of Heat in Solids", Oxford Science Publications, 1959.

The thermal conductivity was measured using a static heater-and-sink method with a nitrogen-cooled Janis cryostat. The sample was mounted atop an alumina base acting as the heat sink. Two thermocouples consisting of a copper-nickel alloy (e.g., constantan) and a copper wire were attached to the side of the stack using what is commonly referred to as GE varnish. A resistive heater having a resistance of 120Ω was placed on top of the stack to provide a heat source. Temperature gradients were stabilized for a minimum of 20 minutes and applied voltages were allowed to settle for five minutes to avoid influence by the pyroelectric effect before measurements were taken. The linearity of Fourier's law was checked using several heater powers and deviation from a linear trend was less than 0.1%.

To assess heat loss in the cryostat at temperatures of 200 to 400 K, the thermal conductivity of a rod of electrolytic iron was measured and compared to National Institute for Science and Technology standard calibration values. The difference between the iron sample's measured conductance and the value calculated from the calibration tables determined the amount of heat loss. The amount of heat loss was then subtracted from the total heat input into the PZT sample at each temperature point at or above 200 K in the experiments with the PZT actuator.

Because the stack tested consists of alternating layers of Ag and PZT, its thermal resistance consists of the sum of the resistances of the PZT layers, the Ag layers, and the interface contact resistances acting like thermal resistances connected in series. However, since the thermal conductivity of Ag (~420 W/mK) is two orders of magnitude larger than that of the PZT (~2 W/mK), it is possible to account for the contribution of the Ag layers by correcting the length of the sample for the relative thickness of the Ag and PZT layers.

Because the stack used to collect experimental data comprises about 60 PZT layers and thus includes about 120 Ag/PZT interfaces, the possibility that the interfacial contact resistance could contribute significantly to the total thermal resistance was nevertheless investigated. The interfacial thermal conductance between PZT and the Ag electrode was measured directly at room temperature using the time-domain thermoreflectance method. This method is known to be reliable with an accuracy of about 10% for interfacial thermal conductance measurements. The measured interfacial conductance value is $6\times10^6$ W/$m^2$·K at each interface. The interfacial thermal resistance thus contributes only 1.3% to the total thermal resistance of the PZT layers alone, and consequently can be ignored.

The thermal conductivity κ(E=0,T) of the unpolarized material is derived from the above measurements and is depicted in FIG. 6B. The values correspond well with the literature. The error in absolute value of the thermal conductivity is dominated by the geometrical error on the measurement of the distance between the thermocouples, and is on the order of 5%. The relative error of the temperature dependence is due to inaccuracies of the correction for heat losses, of the order of 5% at 359 K, but less than 1% at 97 K. The relative error on the field dependence is dominated by the signal-to-noise ratio on the thermocouples, which is typically less than 0.2%.

Figure 7:
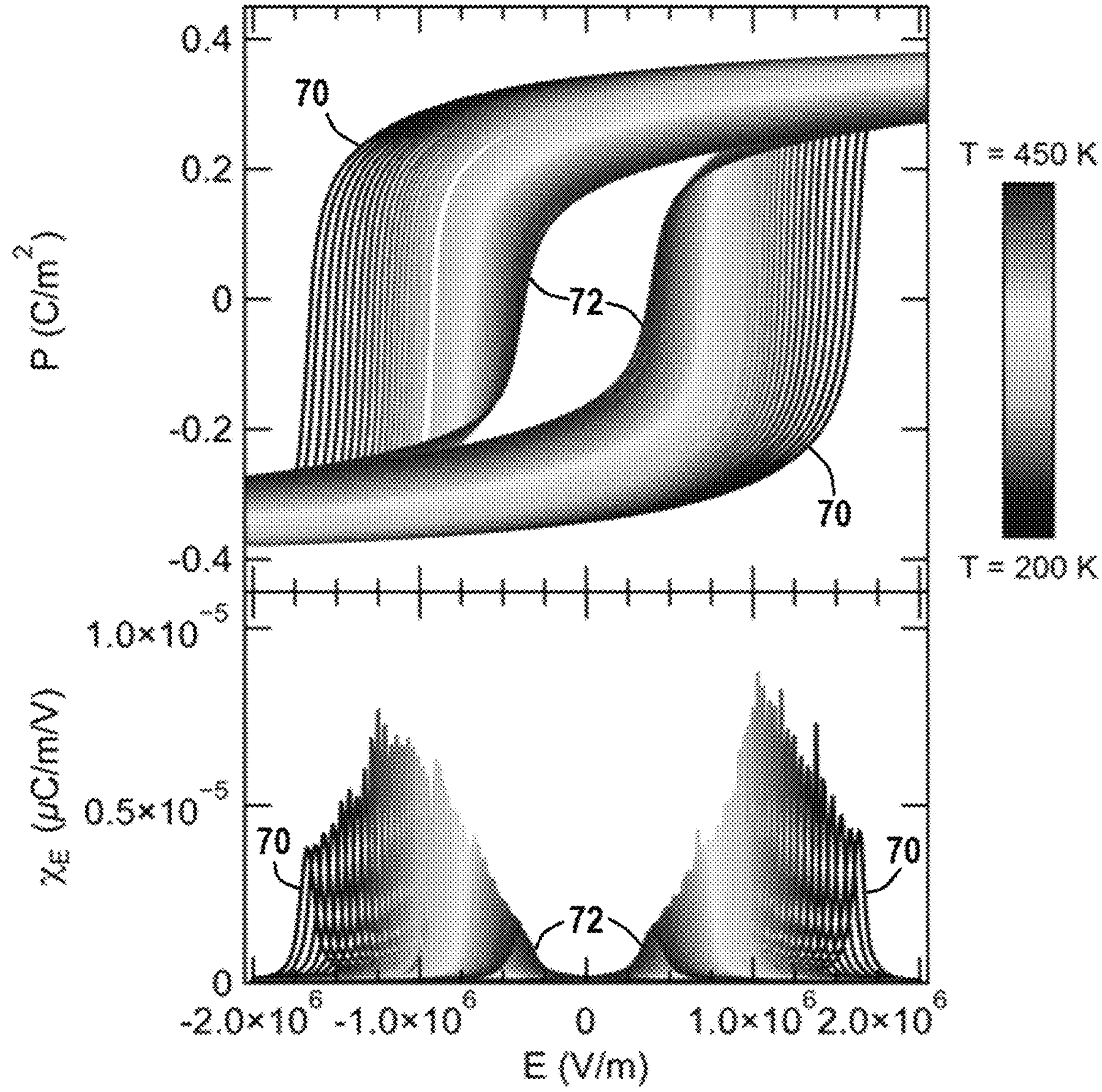
FIG. 7 depicts a graphical view of the polarization and susceptibility of the stack of FIG. 1 versus electric field at a plurality of temperatures.

FIG. 7 depicts a graph with plots illustrating polarization P as a function of electric field (upper portion), and plots illustrating isothermal susceptibility $\chi_E \equiv \partial P/\partial E|_T$ as a function of electric field (lower portion). The plots at the cold end of the scale (T=200 K) in each portion of the graph are indicated by reference number 70, and the plots at the hot end of the temperature scale (T=450 K) in each portion of the graph are indicated by reference number 72. As can be seen, the coercive electric field $E_C$ gradually increases as the temperature decreases. The polarization P was measured at room temperature and a range of 15-100 Hz using a Sawyer-Tower circuit. The Sawyer-Tower circuit is described in detail by C. B. Sawyer, C. H. Tower, "Rochelle Salt as a Dielectric", Physical Review 35, 269-273 (1930). The polarization P can be seen to saturate, with $P_{sat}$=0.2 C $m^3$. The coercive electric field $E_C$ was about $E_C$=0.5×$10^6$ V/m at room temperature, and increased with decreasing temperature.

With the Sawyer-Tower method, the polarization change of the system under a periodic electric field E(t) is monitored through accumulated charges in a reference capacitor connected in series. To this end, an AC voltage of ~104 V at 1.0 Hz was applied to the PZT sample using a reference capacitor of 10 μF. The time-dependent voltage in the reference capacitor was measured using a data acquisition device NI-9215 and converted into a polarization value P(t), considering the sample dimensions and parasitic capacitance of connected cables. To measure the temperature dependence of the P-E curve, the sample being tested was mounted on a sapphire substrate using insulating varnish (General Electronics, GE 7031), and was placed in a cryostat for temperatures T<300 K at vacuum, and on a Peltier device for temperatures T>300 K at atmospheric pressure. In the cryostat, the temperature of the sample was first lowered to 200 K without applying the electric field E and increased after measurements at each temperature step. The derivative ∂P/∂E in the lower portion of the graph in FIG. 7 was obtained from the spline interpolation of the P-E curve.

Figure 8:
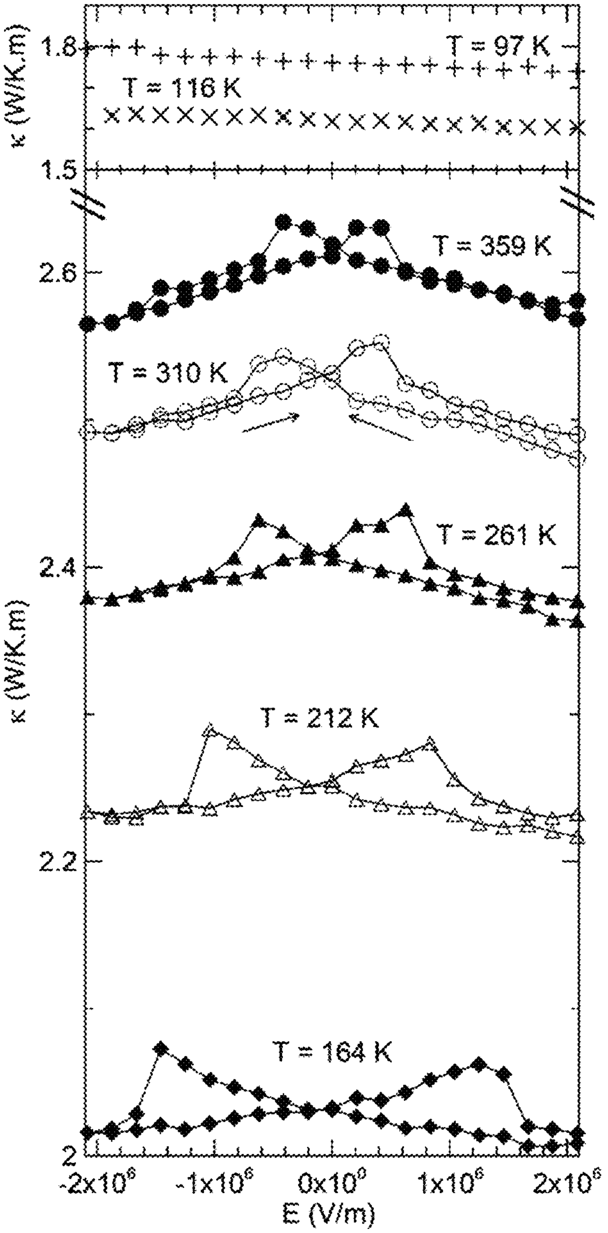
FIG. 8 depicts a graphical view of thermal conductivity versus electric field for increasing and decreasing electric fields at a plurality of temperatures.

FIG. 8 depicts a graph illustrating the thermal conductivity κ(E,T) as a function of electric field at various temperatures, measured using a static heater and sink method. The coercive electric field $E_C$ exceeds the maximum field that could safely be applied to the sample at temperatures T<160 K, so only one branch of the hysteresis loop is shown at 116 K and below. The hysteresis loops could therefore not be completed as the saturation polarization is only reached at temperatures T>160 K. Below that temperature, only one branch can be measured, but the data is sufficient to determine $K' \equiv \partial\kappa/\partial E|_T$.

Figure 15A:
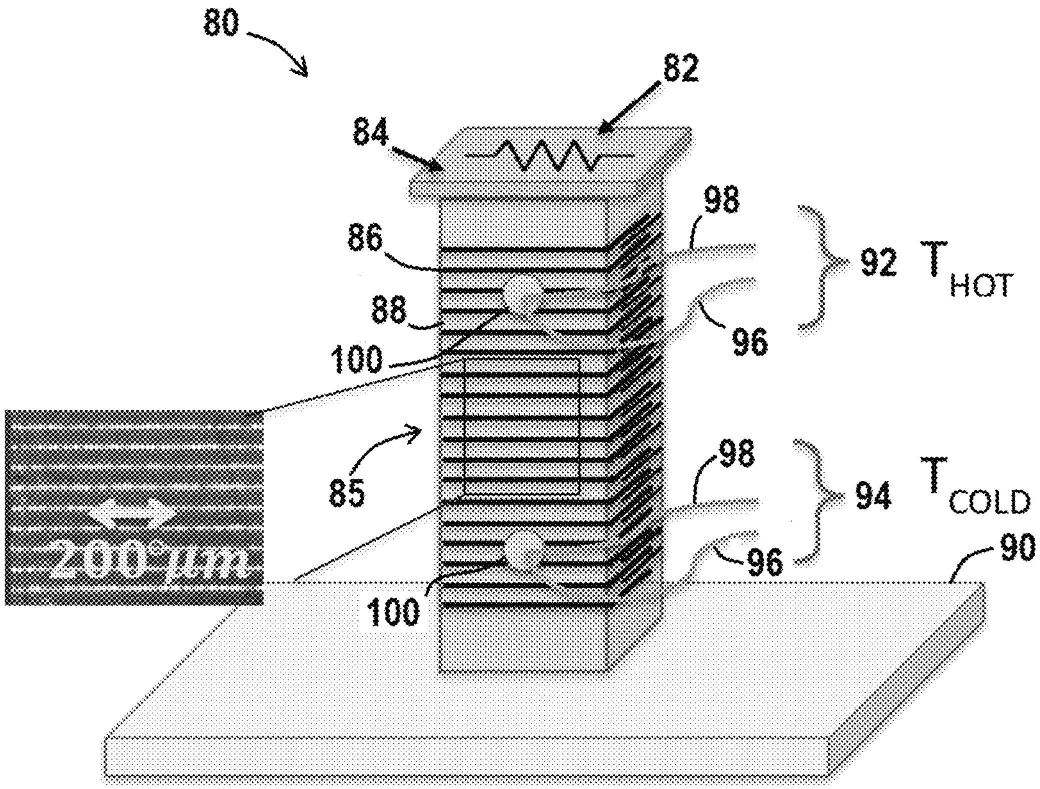
FIG. 15A depicts a schematic view of a test apparatus including a heater and two thermocouples which was used to characterize the stack of FIG. 1.

FIG. 15A depicts a test apparatus 80 used to measure thermal conductivity κ following a static heater-and-sink method with a nitrogen-cooled Janis cryostat. The apparatus 80 includes resistive heater 82, a thermal coupler 84 that spreads out the heat generated by the heater 82 and couples the heater 82 to a stack 85. The stack 85 includes Ag electrode layers 86 and PZT layers 88, and is mounted on an alumina base that functions as a heat sink 90. A hot thermocouple 92 and a cold thermocouple 94 each include a respective constantan 96 and copper wire 98 and are attached to a side of the stack 85 using a bead 100 of heatsink varnish, e.g., General Electric varnish 7031.

The voltages across the constantan 96 and copper wire 98 were measured using two Keithley K2182a nano-voltmeters. The heater 82 has an impedance of 120Ω and is operatively coupled to the top of the stack 50 by the thermal coupler 84 to generate temperature gradients for a minimum of 20 minutes for stability. Applied voltages were allowed to settle for five minutes before measurements were taken to suppress pyroelectric artifacts.

Figure 15B:
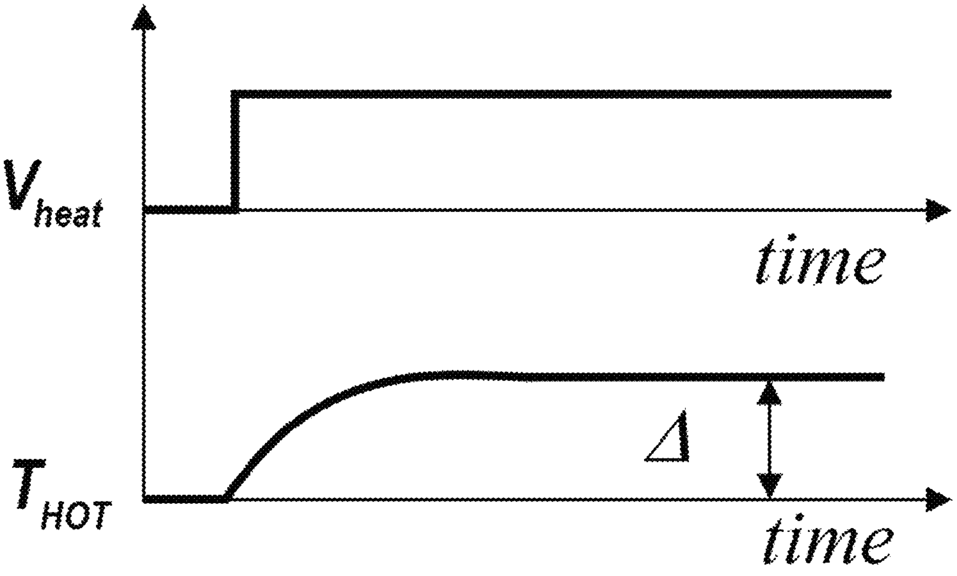
FIG. 15B depicts a graphical view of a temperature response of the stack tested by the apparatus of FIG. 15A.

The linearity of Fourier's law was checked using several heater powers and deviation from a linear trend was less than 0.1%. To assess heat loss in the cryostat at temperatures of 200 to 400 K, the thermal conductivity of a rod of electrolytic iron was measured and compared to National Institute for Science and Technology standard calibration values. The difference between the measured conductance and the value calculated of the iron sample from the calibration tables determined the amount of heat lost. This heat loss was subtracted from the total heat input into the stack 85 at each temperature point above 200 K in the experiments. FIG. 15B depicts a graph showing the temperature measured by the hot thermocouple 92 versus time relative to activation of the heater 82.

Figure 9:
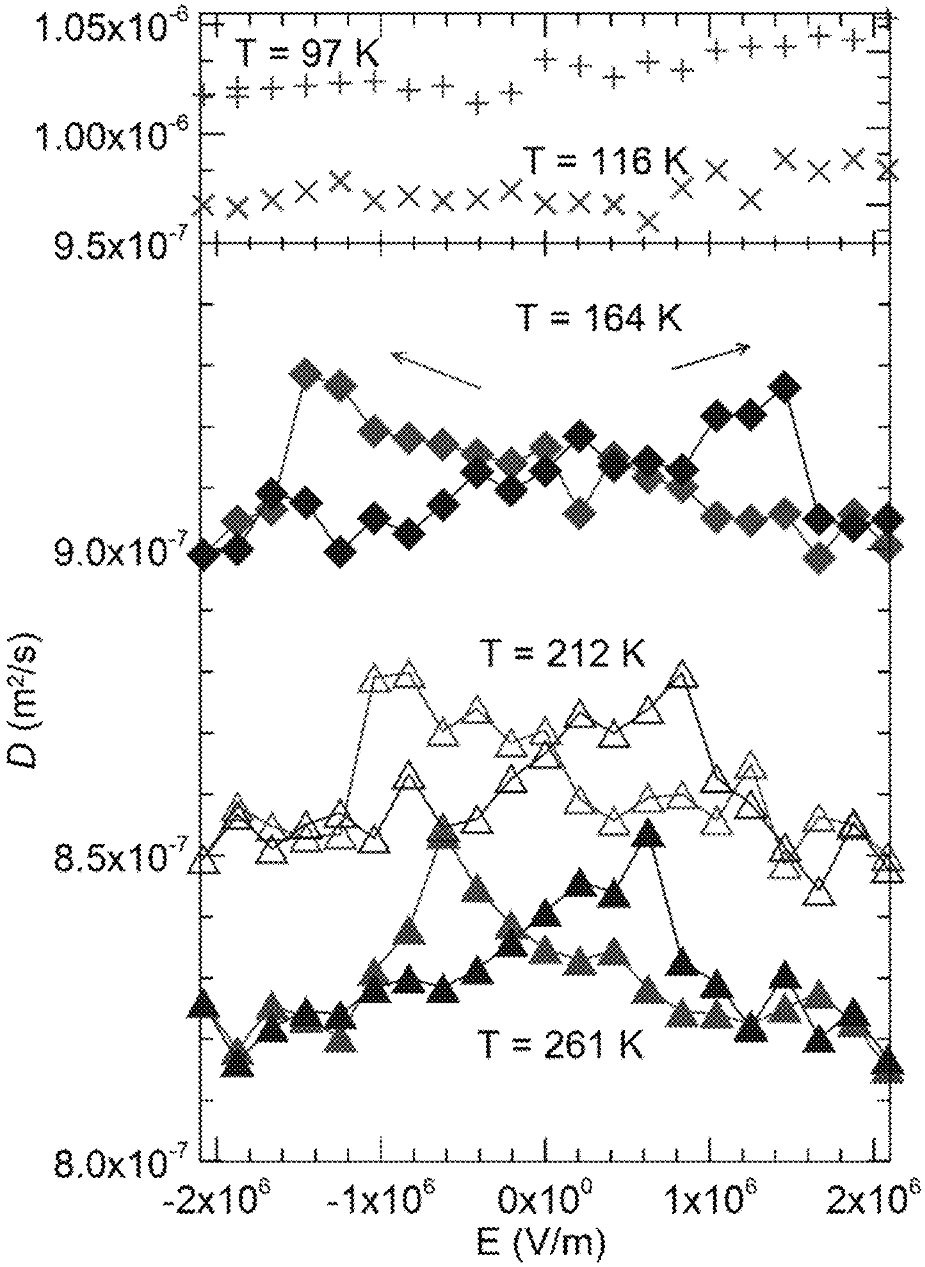
FIG. 9 depicts a graphical view of thermal diffusivity versus electric field for increasing and decreasing electric fields at a plurality of temperatures.

FIG. 9 depicts a graph illustrating the diffusivity D(E,T) as a function of electric field at various temperatures measured directly on the stack 50 using the Ångström method. As for the thermal conductivity, the coercive electric field $E_C$ was not reached at temperatures T<150 K. In this case, the sample remained polarized such that the values of E reported in the figure are antiparallel to P (i.e., the abscissa is really −E) so that D'<0.

The longitudinal acoustic phonon sound velocity was measured using resonant ultrasound spectroscopy. An estimate for the longitudinal acoustic sound velocity of the sample was obtained at room temperature using a Resonant Ultrasound Spectroscopy (RUS) instrument obtained from Alamo Creek Engineering, Santa Fe, NM, USA, while voltage was applied using a Data Precision 8200. In the RUS instrument, a parallelepiped sample is placed between two piezoelectric actuators, and the mechanical resonances were measured (see FIGS. 17A-17C). The electrical contacts to the sample were replaced by long and coiled 25 μm-diameter wires to perturb the natural resonances as little as possible. In a rectangular sample of an isotropic (polycrystalline) material, the frequency $f_L$ of the fundamental longitudinal vibration mode is related to the effective Young's modulus. The sample here is an Ag/PZT multilayer composite, but the Young's modulus of Ag (69 to 74 GPa) and of PZT material (70 to 79 GPa with the voltage contacts open-circuit) are quite close to each other. Thus, it is possible to consider an effective medium approach for this mode and interpret $f_L$ in terms of a single effective Young's modulus $E_Y$ using the relation, $$E_Y = 4\rho L^2 f_L^2 / K$$

where ρ=7893 kg/m3 is the measured density and L=4.23 mm is the measured length. K is a correction factor that is a function of the dimensions of the sample and the Poisson ratio, about 0.34, here K=0.95. The measured value of $f_L$=342.5 kHz gives a Young's modulus of 69.7 GPa. The Young's modulus in isotropic solids is:

$$E_Y = c_{11}(1 - 2(c_{12}/c_{11})^2 + \mathcal{O}((c_{12}/c_{11})^3))$$

where $c_{ij}$ are the components of the elastic constant tensor. In $PbTiO_3$, $c_{12}/c_{11}$~0.3 and $E_Y$ is within 20% of $c_{11}$. The longitudinal acoustic wave sound velocity $v_{LA} = \sqrt{c_{11}/\rho}$, $f_L \propto v_{LA}$ and a longitudinal acoustic sound velocity can be derived to be $$v_{LA} \approx \sqrt{\frac{E_Y}{\rho}} = 3.2 \text{ km/s}$$

with an uncertainty on the absolute value of 10%. The relative error on the logarithmic derivative is much smaller and due to instrument noise, and is indicated by the error bars in the graph depicted by FIG. 10. The same simplifications do not apply to the shear modes, whose properties were not determined from the collected RUS spectrum.

Figure 17A:
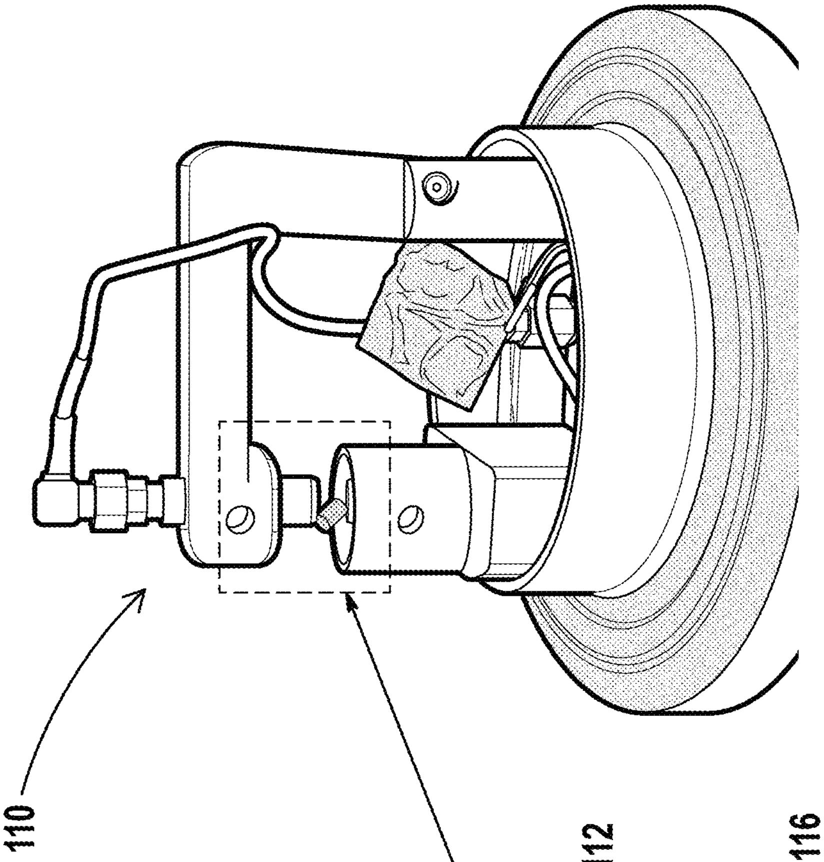
FIG. 17A depicts front view of a Resonant Ultrasound Spectroscopy (RUS) instrument used to measure the resonant frequency of a sample of ferroelectric material.
Figure 17B:
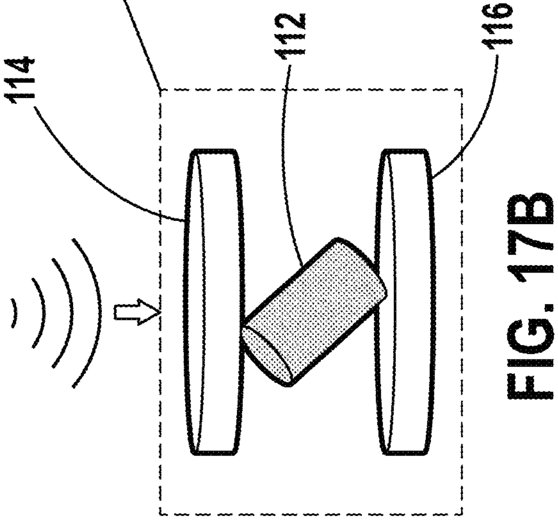
FIG. 17B depicts a schematic view of a fixture holding the sample of FIG. 17A.
Figure 17C:
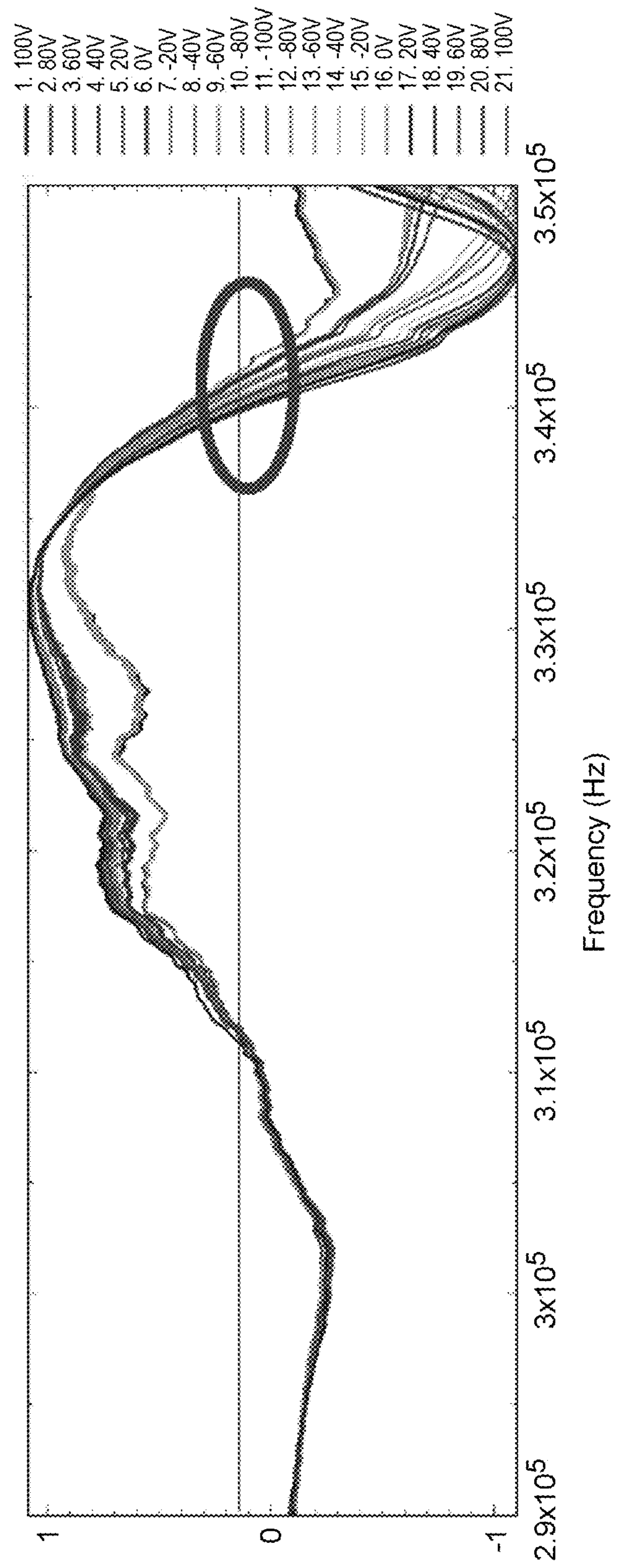
FIG. 17C depicts a graphical view of amplitude versus resonant frequency for the sample of FIG. 17A.

FIG. 17A depicts the RUS instrument 110. FIG. 17B depicts a schematic of the highlighted portion showing the sample under test 112, which is clamped between an upper ultrasound transducer 114 and a lower ultrasound transducer 116. A variable frequency excitation is applied to one of the upper and lower ultrasound transducers 114, 116 (e.g., the upper ultrasound transducer 114), while the voltage on the other of the upper and lower ultrasound transducers 114, 116 (e.g., the lower ultrasound transducer 116) is recorded, giving the amplitude of the vibrations. The in-phase and out-of-phase components of the amplitude of the vibration are plotted as function of frequency. FIG. 17C depicts a graph illustrating the out of phase results where a zero crossing indicates a resonant mode, emphasized with the gray circle. In this experiment, one particular frequency around 340 kHz was identified with the longitudinal compressive resonant mode of the stack (gray circle), and its shift is measured as a function of the voltage applied to the sample.

Figure 10:
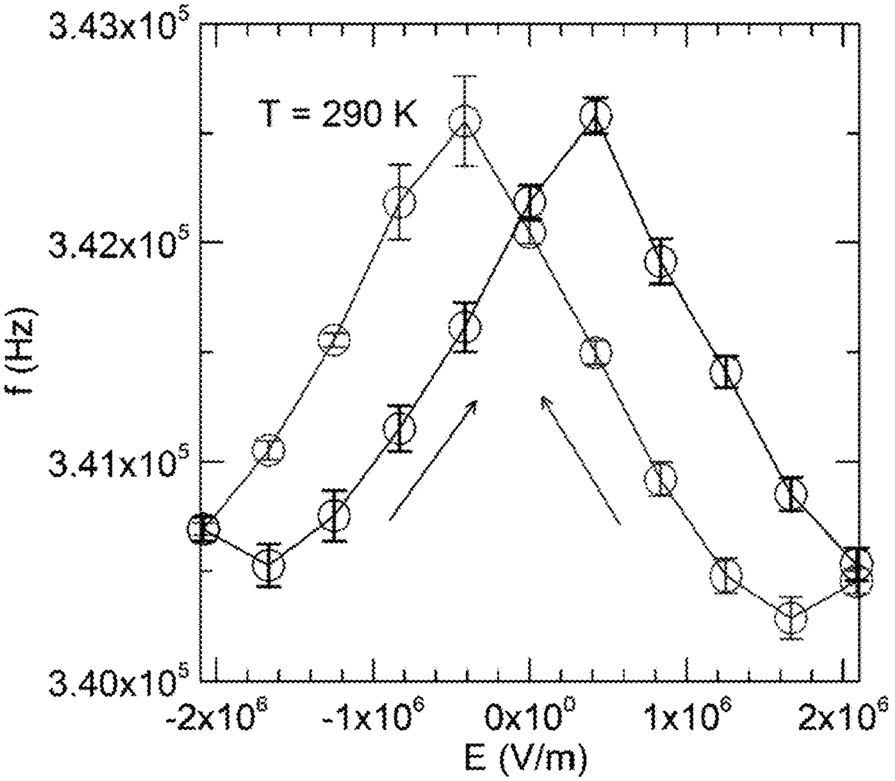
FIG. 10 depicts a graphical view of the mechanical resonance frequency versus electric field for the stack of FIG. 1 at room temperature.

FIG. 10 depicts a graph of the electric field dependence of the mechanical resonance frequency $f_L$ of the longitudinal compressive mode of the stack 50 at room temperature, e.g., 290 K. The ultrasound resonance frequency is about 340 kHz, and corresponds to the longitudinal compressive wave though the sample and thus, to the longitudinal acoustic sound velocity $v_{LA}$. This resonance is identified as 80% due to the elastic constant $c_{11}$ of the PZT along the polarization direction. From the resonance frequency, we derive a sound velocity $v_{LA}$~3.2 km/s to within 10%. Note that since $f_L \propto v_{LA}$, $f_L'/f_L = v_{LA}'/v_{LA}$.

Figure 16:
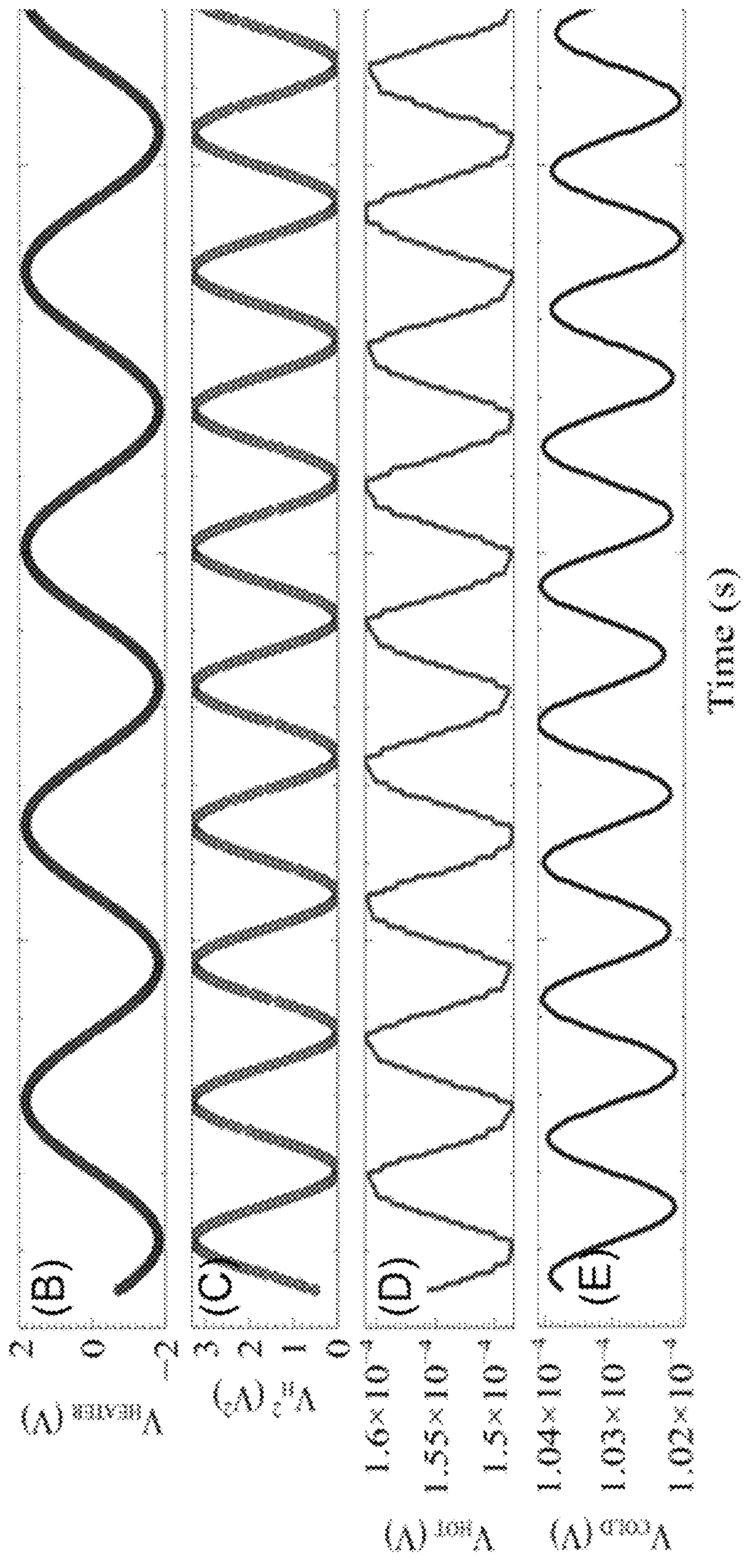
FIG. 16 depicts a graphical view of a sinusoidal voltage applied to the heater, the heating power, and measured voltages on the two thermocouples versus time for the apparatus of FIG. 15A.

FIG. 16 depicts a graph illustrating a sinusoidal voltage (B) being applied to the heater 82. This voltage produces the heating power time dependence shown in the plot (C). The measured voltages on the two thermocouples 92, 94 are shown by plots (D) and (E). The attenuation and phase shift between these two signals are used to derive the diffusivity D as described above. It is presumed that the hot and cold thermocouples 92, 94 have the same calibration, so that the voltages from the hot and cold thermocouples 92, 94 can be used in the data treatment instead of the temperatures $T_{HOT}$ and $T_{COLD}$.

Figure 11:
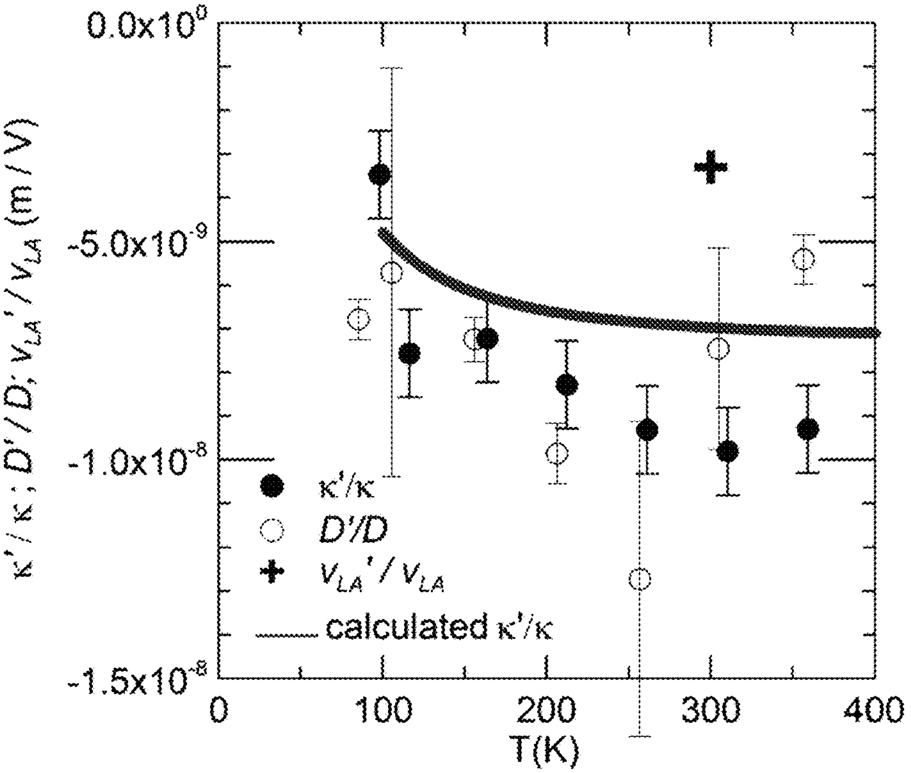
FIG. 11 depicts a graphical view of logarithmic derivatives of the thermal conductivity, thermal diffusivity, and sound velocity versus temperature of the stack of FIG. 1.
Figure 12A:
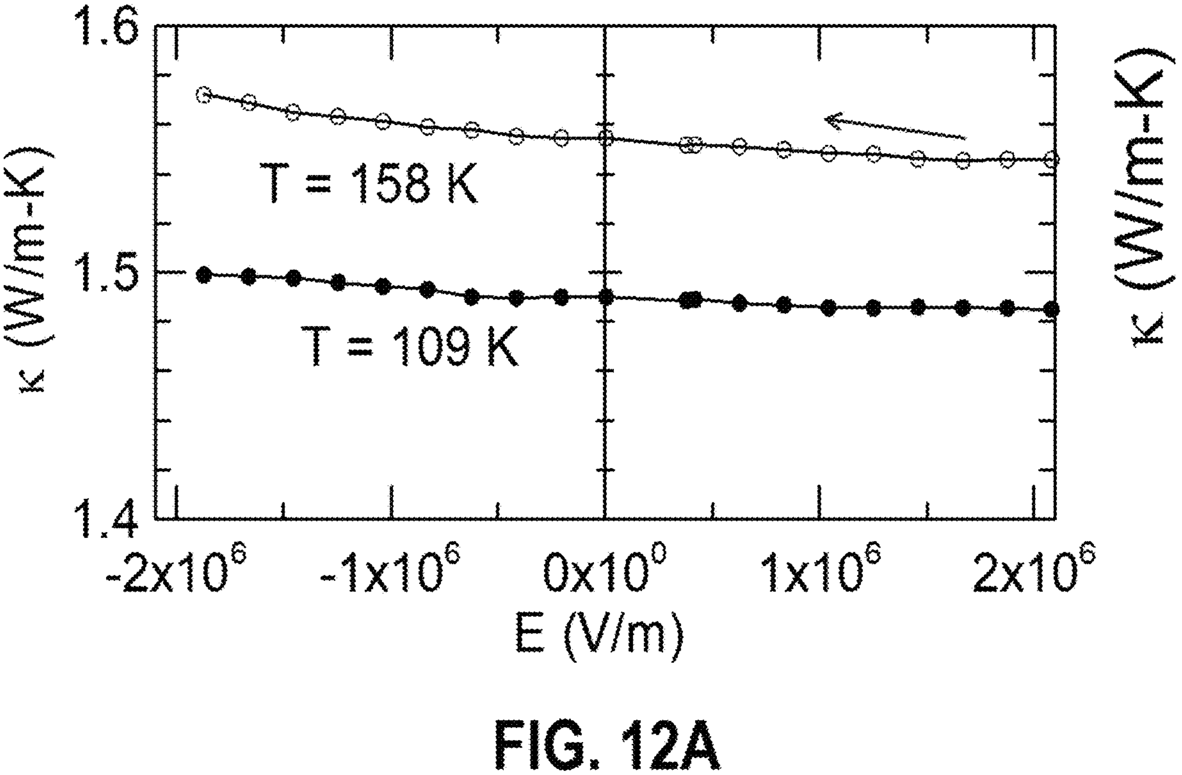
FIG. 12A depicts a graphical view of thermal conductivity versus electric field for a sample of ferroelectric material.
Figure 12B:
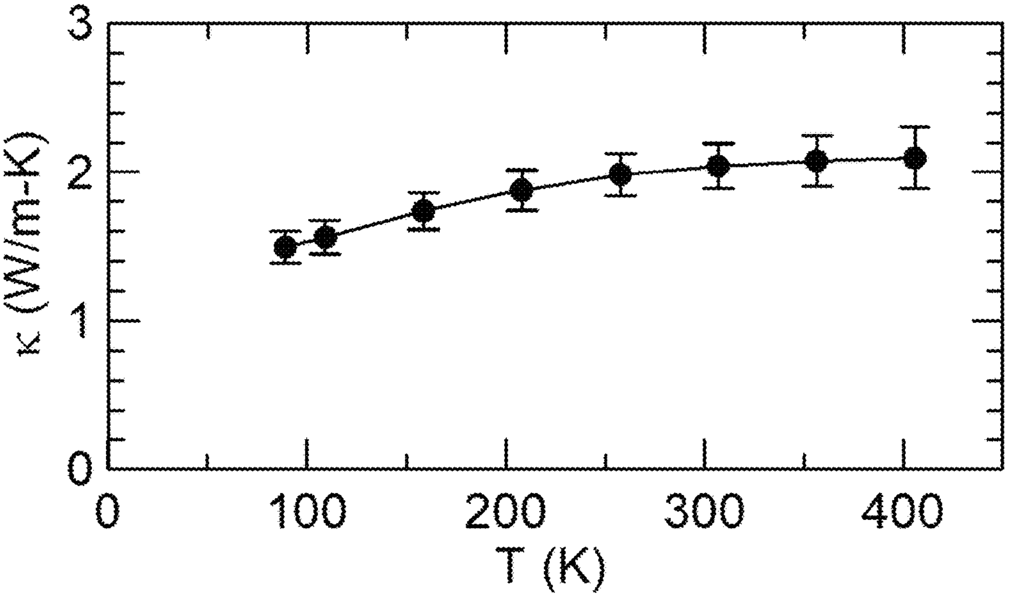
FIG. 12B depicts a graphical view of thermal conductivity versus temperature for the sample of FIG. 12A.

FIG. 11 depicts a graph illustrating the temperature dependence of the logarithmic derivatives of the thermal conductivity κ'/κ (full dots), thermal diffusivity D'/D (open circles), and sound velocity $v_{LA}'/v_{LA}$ (cross) of the PZT stack vis-à-vis electric field. The calculated values of κ'/κ are shown as a thick continuous curve. To calculate the logarithmic derivatives κ'/κ, D'/D, and $f_L'/f_L = v_{LA}'/v_{LA}$, linear regressions were taken on each quantity and each temperature between the electric field where the quantity is maximum to the maximum field. The average slopes of these regressions gave κ', D', and $f_L'$. The values of κ, D, and $f_L$ were taken at a zero coercive electric field $E_C=0$. Advantageously, the value of κ'/κ at 300 K is a factor of ~5 larger than previously known. The error bars in the graph of FIG. 11 combine the relative errors in the field dependences of the quantities and the errors in the regression slopes.

Discussion of Experimental Results

Alloy disorder scattering of phonons dominates the thermal conductivity, but it can be presumed that this mechanism does not depend on the electric field. Thus, a model can be based solely on the modification of the acoustic phonon dispersion caused by field-induced elastic deformation, i.e., electrostriction. Electrostriction exists in all dielectric materials but is enhanced in ferroelectrics. It is caused by the displacement of ions in the crystal lattice under an electric field, that in turn changes the phonon dispersion, sound velocities, thermal conductivity, and diffusivity.

The strain tensor component $e_{33}$ gives the compression/expansion along the direction of the ferroelectric order, and components $e_{11}=e_{22}$ give the deformations perpendicular to the ferroelectric order. They are related to the electric field by the piezoelectric coefficients $d_{33}$ and $d_{31}$ by:

$$d_{33} = \frac{\partial e_{33}}{\partial E};\ d_{31} = \frac{\partial e_{11}}{\partial E} \qquad \text{(Eqn. 2)}$$

The relative change in volume V of a sample due to electrostriction is expressed as a function of the strain tensor components by $\delta V/V = e_{11}+e_{22}+e_{33}$. This changes with electric field as:

$$\frac{d\ln V}{dE} = d_{33} + 2d_{31} \qquad \text{(Eqn. 3)}$$

Using the label λ=(LA, TA) to denote the mode, and ignoring crystalline anisotropy, the phonon frequencies $\omega_\lambda(k)=v_\lambda k$ at low momentum k now depend on the electric field to the first order in momentum k as:

$$\frac{d\omega_\lambda(k)}{dE} = \frac{d\omega_\lambda(k)}{dV}\frac{\partial V}{\partial E} = -\gamma_\lambda(d_{33}+2d_{31})\omega_\lambda(k) + O(k^2) \qquad \text{(Eqn. 4)}$$

where $\gamma_\lambda$ are the low-frequency mode Grüneisen parameters $$\gamma_\lambda \equiv -\frac{d\ln\omega_\lambda(k)}{d\ln V} + O(k).$$

Consequently, in this model:

$$\frac{v_\lambda'}{v_\lambda} = \frac{1}{v_\lambda}\frac{dv_\lambda}{dE} = -\gamma_\lambda(d_{33}+2d_{31}) \qquad \text{(Eqn. 5)}$$

Assuming a Debye model and defining the mode-averaged phonon velocity as $\bar{v}^{-3}=(v_{LA}^{-3}+2v_{TA}^{-3})/3$, we have:

$$C = \frac{3k_B^4T^3}{2\pi^2\hbar^3\bar{v}^3}\int_0^{\Theta/T}\frac{x^4e^x}{(e^x-1)^2}dx \qquad \text{(Eqn. 6)}$$

and κ is expressed in the Boltzmann formalism by:

$$\kappa = \frac{\tau k_B^4T^3}{6\pi^2\hbar^3}\left(\frac{1}{v_{LA}} + \frac{2}{v-TA}\right)\int_0^{\Theta/T}\frac{x^4e^x}{(e^x-1)^2}dx. \qquad \text{(Eqn. 7)}$$

The mode- and direction-averaged value of the Debye temperature Θ depends on $\bar{v}$ as $$\theta = \frac{\hbar\bar{v}}{k_B}\sqrt[3]{\frac{6\pi^2N}{V}},$$

where N is the number of unit cells in volume V. The field derivative of the thermal conductivity is:

$$\frac{d\kappa}{dE} = \frac{d\kappa}{d\Theta}\frac{d\Theta}{dE} + \sum_\lambda\frac{d\kappa}{dv_\lambda}\frac{dv_\lambda}{dE} \qquad \text{(Eqn. 8)}$$

and similarly for dC/dE. That of the diffusivity is:

$$\frac{dD}{dE} = \sum_\lambda\frac{dD}{dv_\lambda}\frac{dv_\lambda}{dE}. \qquad \text{(Eqn. 9)}$$

The use of a Debye model may not be a priori well justified since low-lying optical modes are present in the phonon spectrum. However, the model works well due to the optical modes having a very low group velocity. Below, this model is tested for consistency between κ'/κ, D'/D, and $f_L'/f_L=v_{LA}'/v_{LA}$. These quantities are then computed at room temperature using only the values of the piezoelectric and Grüneisen parameters from the specification sheet of the material and the literature without adjustments. The temperature dependence of κ'/κ can then be derived, also without adjustable parameters.

Setting the temperature T greater than the Debye temperature (T>Θ) and ignoring the optical modes, the specific heat reaches asymptotically the Dulong-Petit value and is constant. In that case, $$D \equiv \frac{\kappa}{C} \approx \frac{\bar{v}^3\tau}{9}\left(\frac{1}{v_{LA}} + \frac{2}{v_{TA}}\right) \qquad \text{(Eqn. 10)}$$

Both κ and D become proportional to $\bar{v}^2$ so that, if the scattering time is not field-dependent:

$$\frac{\kappa'}{\kappa} \approx \frac{D'}{D} \approx 2\frac{\bar{v}'}{\bar{v}}, \text{ for } T > \Theta \qquad \text{(Eqn. 11)}$$

Furthermore, since the piezoelectric coefficients of the material do not depend on the mode and $\gamma_L=\gamma_T=15$, $\bar{v}'/\bar{v}=v'_{LA}/v_{LA}=v'_{TA}/v_{TA}$. For $PbTiO_3$, a Debye temperature Θ~160±30 K was calculated from the spectrum given in Y. Fu. Equation 10 applies at room temperature and provides a parameter-independent test for the model. Table I provides a comparison of the experimental and calculated values of the logarithmic derivatives of the sound velocity, thermal conductivity, and thermal diffusivity at room temperature. The agreement provides a parameter-independent test for the above model and Equation 15 below. Table I also summarizes the room temperature experimental values for these quantities in Equation 11, which is satisfied.

TABLE I

COMPARISON OF EXPERIMENTAL AND CALCULATED VALUES

| Quantity | Measurement (m/V) | Model (m/V) |
|---|---|---|
| $v_L'/v_L = v_T'/v_T$ | $-3.3 \pm 0.5 \times 10^{-9}$ | $-3.5 \times 10^{-9}$ |
| κ'/κ | $-9.5 \pm 1 \times 10^{-9}$ | $-7.0 \times 10^{-9}$ |
| D'/D | $-7.2 \pm 2 \times 10^{-9}$ | $-7.1 \times 10^{-9}$ |

A quantitative comparison requires knowledge of the piezoelectric and Grüneisen parameters of the material. Only $d_{33}=435\times10^{-12}$ m/V was provided by the manufacturer. Taking $\gamma_L=\gamma_T=15$ as disclosed by Y. Fu, and $d_{31}=-100$ pm/V (the value given for $PbTiO_3$ in I. Kanno, S. Fujii, T. Kamada, R. Takayama, "Piezoelectric properties of c-axis oriented $Pb(Zr,Ti)O_3$ thin films", *Applied Physics Letters* 70, 1378-1380 (1997)), it is possible to derive the values given in the column "model" in Table I from Equations 5 and 11. Once again, the values fit the measurements surprisingly well, particularly given the simplicity of the model and the fact that contributions by the optical phonons are disregarded.

Finally, the model can be extended to variable temperatures including T~Θ by solving Equation 7 and considering the temperature dependence of the piezoelectric coefficients. The electrostriction coefficients $Q_{ij}$ relate the strain to the polarization Po and are given by:

$$e_{33}=Q_{11}P_0^2;\ e_{11}=e_{22}=Q_{12}P_0^2 \qquad \text{(Eqn. 12),}$$

so that the piezoelectric coefficients $d_{33}$ and $d_{31}$ can be written as:

$$d_{33}=2Q_{11}P_0\chi_E;\ d_{31}=2Q_{12}P_0\chi_E \qquad \text{(Eqn. 13).}$$

For $PbTiO_3$ with a centrosymmetric parent paraelectric phase, the Landau-Ginzburg-Devonshire theory for displacive ferroelectrics gives the polarization and susceptibility as:

$$P_0^2 = \frac{-\alpha_{11} + \sqrt{\alpha_{11}^2 - 3\alpha_1\alpha_{111}}}{3\alpha_{111}} \qquad \text{(Eqn. 14)}$$

$$\chi_E = \frac{1}{2(\alpha_1 + 6\alpha_{11}P_0^2 + 15\alpha_{111}P_0^2)}$$

where $\alpha_1$, $\alpha_{11}$ and $\alpha_{111}$ are the Landau expansion coefficients. Further, $\alpha_1=\alpha_0(T-T_C)$ where $\alpha_0$ is the Curie-Weiss constant and $T_C$ the ferroelectric Curie temperature. For constant $Q_{11}$ and $Q_{12}$ (disregarding here the small effect of the thermal expansion on the Debye temperature), $d_{33}$ and $d_{31}$ increase with temperature. The calculated temperature-dependent κ'/κ for $PbTiO_3$ using the parameters that are given in M. J. Haun, E. Furman, S. J. Jang, H. A. Mckinstry, L. E. Cross, "Thermodynamic theory of PbTiO3", *Journal of Applied Physics* 62, 3331-3338 (1987) is about half that of the κ'/κ measured. The difference is due to $d_{33}$, which is $340\times10^{-12}$ m/V in $PbTiO_3$ versus $435\times10^{-12}$ m/V in the PZT studied. Adjusting the calculated κ'/κ using the room-temperature value of $d_{33}=435\times10^{-12}$ m/V, we obtain the thick continuous curve in FIG. 11, which reproduces the temperature dependent data.

The thermal diffusivity D was measured using the Ångström method on the same sample with the same mounting procedure as the thermal conductivity (see FIG. 15A). The heat output of the heater 82 was varied sinusoidally following $Q=Q_0\cos(\omega t)$ at a frequency of $\omega/2\pi=0.24$ Hz along the length of the stack 85. That frequency was selected so that the thermal diffusion length in the sample would be on order of 1 to 1.5 mm, comparable to the distance between the thermocouples and the distance between the hot thermocouple and the heater. The voltage across the two thermocouples, measured with two K2182a nano-voltmeters, was recorded for 3000 cycles. An example of the collected data is shown in FIG. 16. Software was written to emulate the operation of a lock-in amplifier on the two thermocouple signals, giving the phase φ and amplitude |T| of the temperatures $T_{HOT}$ and $T_{COLD}$ at two points along the length of the sample at distances $x_{HOT}$ and $x_{COLD}$ from the heater 82. To find the relationship between the phase, amplitude, and the diffusivity, a 1D semi-infinite rod model was used, with varying heat applied at point x=0. The temperature as a function of both length x along the rod and time t is:

$$T(x,t)=T_0e^{-kx}\cos(\omega t-kx-\phi) \qquad \text{Eqn. (15)}$$

where:

$$k=\sqrt{\omega/2D}$$

is the propagation vector, D the diffusivity, and ϕ an instrumental phase shift. The thermal diffusion length is 1/k. Taking a measurement of temperature at two locations $x_{HOT}$ and $x_{COLD}$ on the PZT stack, the propagation vector k and thus D, can be derived from the amplitude attenuation $(\ln(T_{HOT}/T_{COLD}))$ or from the phase shift:

$$k = \frac{\ln|T_{HOT}| - \ln|T_{COLD}|}{x_{HOT} - x_{COLD}} = \frac{\varphi_{HOT} - \varphi_{COLD}}{x_{HOT} - x_{COLD}} \qquad \text{Eqn. (16)}$$

The amplitude attenuation typically gives better accuracy, while the phase is used to check for experimental consistency. The relative accuracy of this method is of the order of 1%, compared to a relative error of typically just under 10% when using time-domain thermoreflectance, but not as good as the error on the thermal conductivity change which is <0.2%.

Comparing the above results to previous results in the literature, Mante discloses that thermal conductivity κ(E) in single-crystal $BaTiO_3$ increases 2 to 5-fold at T=5 K by applying electric fields of $E=1.1\times10^6$ V/m. This result was interpreted in terms of phonon scattering by ferroelectric domain walls. At T<15 K domain wall scattering supersedes phonon-phonon Umklapp scattering, so that the thermal conductivity increases as domains grow under the applied field. However, this mechanism is not believed to work near room temperature, where the Umklapp-dominated phonon mean free path is much shorter than the domain size, nor in samples in which alloy scattering of phonons does the same. Ihlefeld discloses a decrease of $[\kappa(E)-\kappa(E=0)]/\kappa(E=0)\sim-11\%$ for $E=4.14\times10^{7}$ V/m, or $\kappa'/\kappa=-2.6\times10^{-9}$ m/V in PZT thin films at room temperature. This is roughly a factor of four smaller than the results described herein. This decrease in thermal conductivity (E) may be attributed to an increasing domain wall density with increasing E, a counter-intuitive idea supported by piezoresponse force microscopy (P. E. Hopkins, C. Adamo, L. Ye, B. D. Huey, S. R. Lee, D. G. Schlom, J. F. Ihlefeld, "Effects of coherent ferroelastic domain walls on the thermal conductivity, and Kapitza conductance in bismuth ferrite", *Appl. Phys. Lett.* 102, 121903 (2013)) and scanning electron microscopy (SEM) data (J. F. Ihlefeld, J. R. Michael, B. B. Mckenzie, D. A. Scrymgeour, J. Maria, E. A. Paisley, A. R. Kitahara, "Domain imaging in ferroelectric thin films via channeling-contrast backscattered electron microscopy", *Journal of Materials Science* 52, 1071-1081 (2016)). Recently, K. Aryana et al., "Observation of solid-state bidirectional thermal conductivity switching in antiferroelectric lead zirconate ($PbZrO_3$)", Nat Commun 13, 1573 (2022) disclosed $[\kappa(E)-\kappa(E=0)]/\kappa(E=0)\sim-10\%$ for $E=6\times10^{7}$ V/m ($\kappa'/\kappa=-1.7\times10^{-9}$ m/V) in antiferroelectric PZT of a different composition than the ferroelectric material used here. The change of κ with E is interpreted as originating from grain boundary scattering induced by the presence of both antiferroelectric and ferroelectric phases and their phase change at $E=3.7\times10^{7}$ V/m. The results herein describe a 2 to 5 times larger effect with $\kappa'/\kappa=-5\times10^{-9}$ m/V at 100 K and reaching $\kappa'/\kappa=-1\times10^{-8}$ m/V at T>300 K in bulk polycrystalline PZT samples.

Advantageously, an electric field dependence of the thermal conductivity of a bulk ferroelectric PZT from 97 to 359 K was measured using exemplary device 60 that was almost five times larger in magnitude to that previously known. The present data on bulk samples near room temperature can be explained by electrostriction that mixes the polarization of the optical modes into the acoustic ones. The good correspondence between the values obtained for the electric field derivatives of the sound velocity, a property at thermodynamic equilibrium, and the thermal conductivity and diffusivity, transport properties, corroborates this finding. Thus, the observed electric field dependence of thermal conductivity is not caused by a scattering effect, but rather a property of the phonon spectra. T. Tong, J. Karthik, R. V. K. Mangalam, L. W. Martin, D. G. Cahill, "Reduction of the electrocaloric entropy change of ferroelectric $PbZr_{1-x}Ti_xO_3$ epitaxial layers due to an elastocaloric effect", *Physical Review B* 90, (2014) discloses that the same electrostriction-induced change in the phonon spectrum contributes to the electrocaloric effect.

To generalize these findings, Equation 5 offers insight on how to select materials that maximize electric-field induced lattice thermal conductivity changes. Two properties are advantageous: (1) high Grüneisen parameters indicating highly anharmonic acoustic phonons and (2) a high piezoelectric coefficient. The presence of a permanent polarization vector, as in the material studied here, is not actually necessary to maximize K'. Accordingly, the search for better preforming thermal switching materials is not confined to ferroelectrics, but can include piezoelectrics, pyroelectrics, and even para- and polar-dielectrics. In order to maximize K'/x it is also useful to minimize «, here by alloy disorder scattering, but also by applying other techniques inspired from research on thermoelectrics, such as nanostructuring. The field-dependent sound velocity implies that the electrostriction mixes the optical phonons illustrated in FIGS. 4A-4D which dominate the electrocaloric properties with the acoustic phonons. Ferrons can thus be both optical and acoustic phonons.

Figure 18A:
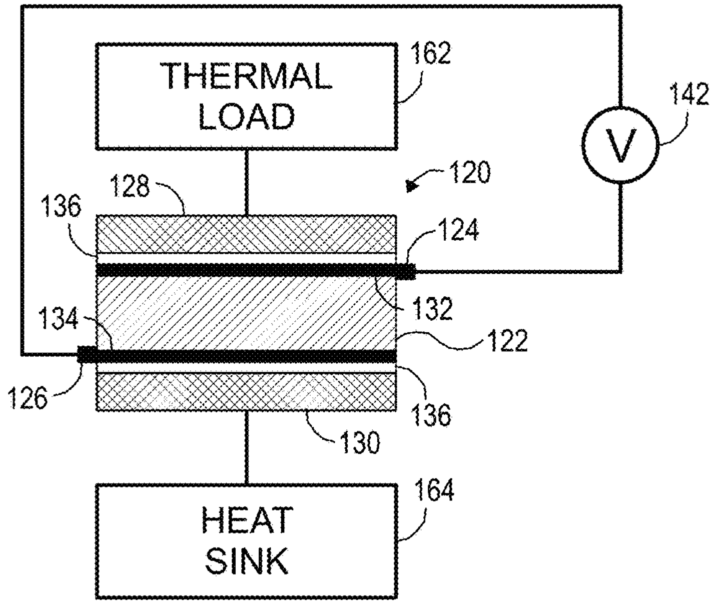
FIGS. 18A-18D depict schematic views of electrically controlled solid-state thermal switches in accordance with an embodiment of the invention.

FIG. 18A depicts an exemplary solid-state electrically controlled thermal switch 120 configured in accordance with the above disclosure. The thermal switch 120 includes a body 122 comprising a layer of electrostrictive material, upper and lower electrodes 124, 126, and upper and lower thermal couplers 128, 130. The body 122 includes an upper face 132 that is operatively coupled to the upper electrode 124, and a lower face 134 generally opposite the upper face 132 that is operatively coupled to the lower electrode 126. The body 122 may have a typical thickness (i.e., distance between lower and upper faces 132, 134) of between 2 and 4 mm, however embodiments are not limited to this range of thicknesses. In practice, the thickness of the body 122 may be determined by the operational specifications of the thermal switch 120, and may range, for example, from 1 μm to 10 mm or more, depending on the application.

The body 122 may be coupled to the electrodes 124, 126 by direct contact or through a thermally conductive layer (not shown). By way of example, each electrode 124, 126 may be formed by depositing an electrically conductive material such as a metal (e.g., silver, gold, copper, aluminum, etc.) an epitaxial conductive oxide (e.g., $SrRuO_3$, $(La,Sr)MnO_3$, etc.) or other suitable conductive material directly on the respective face 132, 134 of the electrostrictive material, or to an adhesion layer (e.g., titanium) deposited on the respective face 132, 134 of the electrostrictive material. The electrodes 124, 126 may thereby be configured to apply an electric field to (e.g., across) at least a portion of electrostrictive material (e.g., the portion between the electrodes 124, 126) in response to a voltage being applied to the electrodes 124, 126.

Each thermal coupler may be operatively (e.g., thermally) coupled to a respective face 132, 134 through a respective one of the electrodes 124, 126. To this end, each thermal coupler 128, 130 may be coupled to a respective electrode 124, 126 by a respective dielectric layer 136 to isolate the thermal couplers 128, 130 from voltages applied to the electrodes 124, 126. Suitable dielectric layers 136 may include thin films of silicon dioxide, aluminum oxide (sapphire), silicon or aluminum nitride, diamond, etc. In an alternative embodiment, one or both of the dielectric layers 136 may be omitted. In either case, the thermal couplers 128, 130 may thereby be operatively coupled to the electrostrictive material through the dielectric layer 136 (when present) and the electrodes 124, 126 such that the thermal resistance between each thermal coupler 128, 130 and the body 122 of thermal switch 120 is less than the thermal resistance through the body 122 of thermal switch 120. In any case, the faces to which the thermal couplers 128, 130 are operatively coupled may define a thermal path through the electrostrictive material forming the body 122 of switch 120 such that heat can flow from one thermal coupler to the other along the thermal path.

Figure 18B:
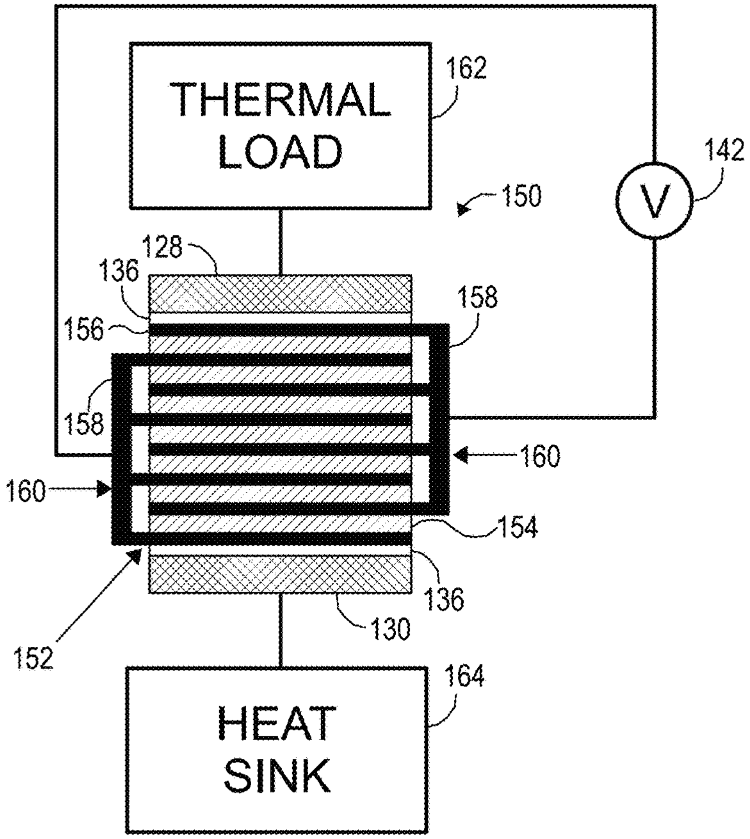

FIG. 18B depicts another exemplary solid-state electrically controlled thermal switch 150 configured in accordance with the above disclosure in which like reference numerals refer to like components in FIG. 18A. The thermal switch 150 includes a body 152 comprising a plurality of electrostrictive material layers 154 alternating with electrically conductive layers 156. The electrically conductive layers 156 are alternately coupled to one of a plurality of electrode terminals 158, thereby defining the electrodes 160 of thermal switch 150.

Figure 18C:
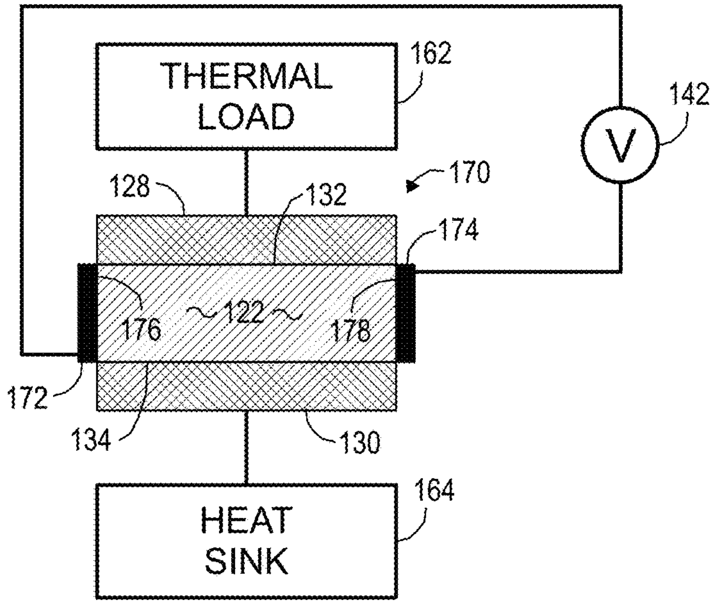

FIG. 18C depicts another exemplary solid-state electrically controlled thermal switch 170 configured in accordance with the above disclosure in which like reference numerals refer to like components in FIGS. 18A and 18B. The thermal switch 170 includes the body 122, upper and lower thermal couplers 128, 130, and left and right electrodes 172, 174. The body 122 includes a left face 176 that is operatively coupled to the left electrode 172, and a right face 178 generally opposite the left face 176 that is operatively coupled to the right electrode 174. Each thermal coupler 128, 130 may be operatively (e.g., thermally) coupled to a respective face 132, 134 of body 122. To this end, each thermal coupler 128, 130 may be coupled to the body 122 directly (shown) or through a respective dielectric layer 136 (not shown).

Figure 18D:
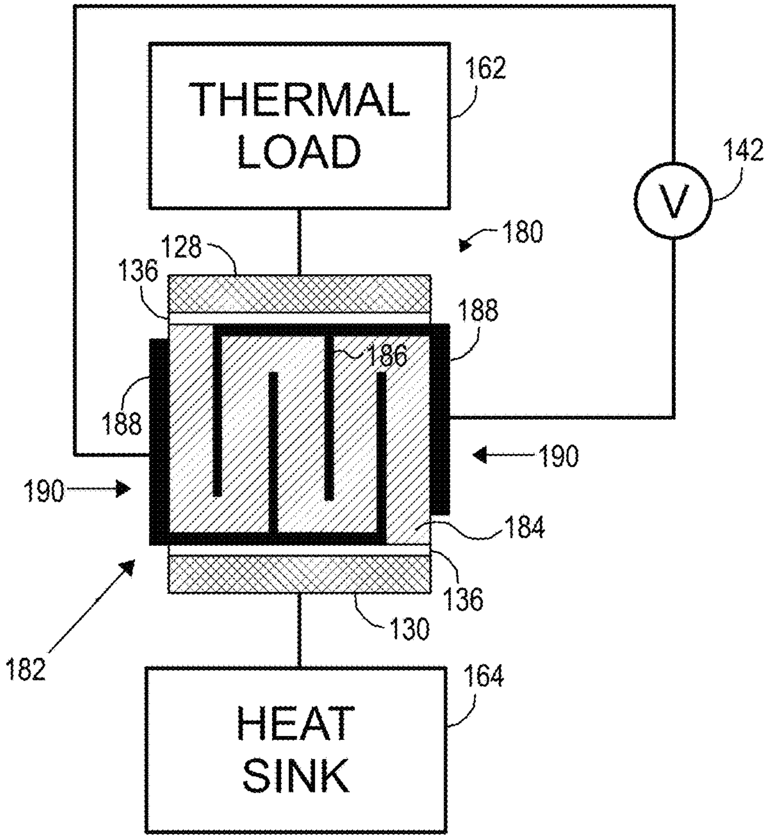

FIG. 18D depicts another exemplary solid-state electrically controlled thermal switch 180 configured in accordance with the above disclosure in which like reference numerals refer to like components in FIGS. 18A-18C. The thermal switch 180 includes a body 182 comprising a plurality of electrostrictive layers 184 alternating with electrically conductive layers 186. The electrically conductive layers 186 are alternately coupled to one of a plurality of electrode terminals 188, thereby defining the electrodes 190 of thermal switch 180.

In contrast to the generally parallel orientation between directions of the electric field and heat flux in the thermal switches 120, 150 depicted by FIGS. 18A and 18B, in the thermal switches 170, 190 depicted by FIGS. 18C and 18D, the direction of the heat flux and electric fields are at intersecting angles (e.g., orthogonal) to each other. Thus, it should be understood that embodiments of the invention are not limited any particular angular relationship between the electric field and the heat flux in the thermal switch.

The smallest dimension (e.g., thicknesses) of each electrostrictive layer may be greater than 1 μm, and preferably greater than 5 μm. The total thickness of the electrostrictive material through which the heat flux must travel in each the thermal switch 120, 150, 170, 180 may be selected according to an on and/or off thermal resistance design criteria. As described above, this thickness may depend on both the thermal conductivity of the electrostrictive material and the design specifications of the thermal switch 120, 150, 170, 180. In any case, dividing the total thickness of the electrostrictive material into multiple electrostrictive layers 154, 184 as in the bodies 152, 182 of thermal switches 150, 180 may enable relatively high coercive electric fields $E_C$ to be generated by relatively low control voltages as compared to having a body 122 comprising a single electrostrictive layer as in the thermal switches 120 of FIGS. 18A and 18C.

In operation, one thermal coupler 128 of the thermal switch 120, 150, 170, 180 may be thermally coupled to a thermal load 162, and the other thermal coupler 130 may be thermally coupled to a heat sink 164. The thermal load 162 may be either a cooling load (i.e., heat is to be removed from the thermal load 162 such as in a cryogenic application) or a heating load (i.e., heat is to be transferred into the thermal load, such as in a heat leveling application). The heat sink 164 may be a thermal reservoir which is configured to either receive heat from the thermal switch 120, 150, 170, 180 or supply heat to the thermal switch 120, 150, 170, 180. A control voltage 142 may be applied to the electrodes 126, 124, 160, 172, 174, 190 to selectively cycle the thermal impedance of the body 122, 152, 182 so as to thermally couple the thermal load 162 to the heat sink 164 in a controlled manner.

The terminology used herein is for the purpose of describing particular embodiments only, and is not intended to be limiting of the embodiments of the invention. As used herein, the singular forms "a", "an" and "the" are intended to include both the singular and plural forms, and the term "or" is intended to include both alternative and conjunctive combinations, unless the context clearly indicates otherwise. It will be further understood that the terms "comprises" or "comprising," when used in this specification, specify the presence of stated features, integers, actions, steps, operations, elements, or components, but do not preclude the presence or addition of one or more other features, integers, actions, steps, operations, elements, components, or groups thereof. Furthermore, to the extent that the terms "includes", "having", "has", "with", "comprised of", or variants thereof, are used in either the detailed description or the claims, such terms are intended to be inclusive in a manner similar to the term "comprising".

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A solid-state electrically controlled thermal switch, comprising:
- a first electrode including a plurality of first conductive layers;
- a second electrode including a plurality of second conductive layers;
- a plurality of electrostrictive layers, wherein each electrostrictive layer:
  - includes an electrostrictive material having a plurality of faces including an upper face, a lower face opposite the upper face, a left face, and a right face opposite the left face,
  - a first face of the plurality of faces is operatively coupled to a respective first conductive layer of the first electrode, the first face being one of the left face or the right face of the electrostrictive material, and
  - a second face of the plurality of faces is operatively coupled to a respective second conductive layer of the second electrode, the second face being the other of the left face or the right face of the electrostrictive material opposite the first face,
- a first thermal coupler operatively coupled to the upper face of the electrostrictive material of each electrostrictive layer of the plurality of electrostrictive layers; and
- a second thermal coupler operatively coupled to the lower face of the electrostrictive material of each electrostrictive layer of the plurality of electrostrictive layers, wherein:
- the electrostrictive layers, the first conductive layers, and the second conductive layers define a stack of alternating layers of the electrostrictive material and the first and second conductive layers, the first and second electrodes are configured to apply an electric field to at least a portion of the electrostrictive material of each electrostrictive layer in response to a voltage being applied across the first and second electrodes, the upper and lower faces of the electrostrictive material of each electrostrictive layer define a thermal path through the electrostrictive layer that includes at least a part of the portion of the electrostrictive layer across which the electric field is applied, and applying the electric field to the at least the portion of each electrostrictive layer selectively alters a thermal conductivity of the thermal switch.

2. The thermal switch of claim 1, wherein the electrostrictive material comprises a ferroelectric material.

3. The thermal switch of claim 2, wherein the ferroelectric material comprises a perovskite ferroelectric.

4. The thermal switch of claim 3, wherein the perovskite ferroelectric comprises a rhombohedral perovskite ferroelectric, a tetragonal perovskite ferroelectric, or an orthorhombic perovskite ferroelectric.

5. The thermal switch of claim 2 wherein the ferroelectric material is selected from the group consisting of $(Pb,La)(Zr,Ti,Nb)O_3$, $BaTiO_3$, $BiFeO_3$, $(Ba,Sr)TiO_3$, $(Ba,Ca,Sr)TiO_3$, $(Ba,Sr)(Ti,Zr)O_3$, $(Ba,Sr,Ca,Pb)(Ti,Zr,Hf,Sn)O_3$, $LiNbO_3$, and $(Bi,RE)FeO_3$, wherein RE is a lanthanide metal cation.

6. The thermal switch of claim 2, wherein a temperature of the electrostrictive material is below a Curie temperature of the electrostrictive material.

7. The thermal switch of claim 1, wherein the electrostrictive material comprises a paraelectric material.

8. A solid-state electrically controlled thermal switch, comprising:

an electrostrictive material including an upper face and a lower face opposite the upper face;

a first electrode operatively coupled to the upper face of the electrostrictive material;

a second electrode operatively coupled to the lower face of the electrostrictive material;

a first thermal coupler operatively coupled to the upper face of the electrostrictive material, at least a portion of the first thermal coupler being operatively coupled to the upper face of the electrostrictive material through at least a portion of the first electrode, and a second thermal coupler operatively coupled to the lower face of the electrostrictive material, at least a portion of the second thermal coupler being operatively coupled to the lower face of the electrostrictive material through at least a portion of the second electrode, wherein:

the first and second electrodes are configured to apply an electric field to at least a portion of the electrostrictive material in response to a voltage being applied across the first and second electrodes, the upper and lower faces define a thermal path through the electrostrictive material that includes at least a part of the portion of the electrostrictive material across which the electric field is applied, and applying the electric field to the at least the portion of the electrostrictive material selectively alters a thermal conductivity of the thermal switch.

9. The thermal switch of claim 8, further comprising:

a first dielectric layer positioned between the first thermal coupler and the first electrode, the first dielectric layer configured to thermally couple the first thermal coupler to the first electrode and electrically insulate the first thermal coupler from the first electrode; and a second dielectric layer positioned between the second thermal coupler and the second electrode, the second dielectric layer configured to thermally couple the second thermal coupler to the second electrode and electrically insulate the second thermal coupler from the second electrode.

10. A solid-state electrically controlled thermal switch, comprising:

a first electrode including a plurality of first conductive layers;

a second electrode including a plurality of second conductive layers;

a plurality of electrostrictive layers, wherein each electrostrictive layer:

includes an electrostrictive material having a plurality of faces including an upper face and a lower face opposite the upper face, a first face of the plurality of faces is operatively coupled to a respective first conductive layer of the first electrode, the first face being one of the upper face or the lower face of the electrostrictive material, and a second face of the plurality of faces is operatively coupled to a respective second conductive layer of the second electrode, the second face being the other of the upper face or the lower face of the electrostrictive material opposite the first face;

a first thermal coupler operatively coupled to the upper face of the electrostrictive material of an uppermost electrostrictive layer of the plurality of electrostrictive layers; and a second thermal coupler operatively coupled to the lower face of the electrostrictive material of a lowermost electrostrictive layer of the plurality of electrostrictive layers, wherein:

the electrostrictive layers, the first conductive layers, and the second conductive layers define a stack of alternating layers of the electrostrictive layers and the first and second conductive layers, the first and second electrodes are configured to apply an electric field to at least a portion of the electrostrictive material of each electrostrictive layer in response to a voltage being applied across the first and second electrodes, the upper face of the plurality of faces of the uppermost electrostrictive layer and the lower face of the plurality of faces of the lowermost electrostrictive layer define a thermal path through the electrostrictive layers that includes at least a part of the portion of each electrostrictive layer across which the electric field is applied, and applying the electric field to the at least the portion of each electrostrictive layer selectively alters a thermal conductivity of the thermal switch.

* * * * *